US009643742B2

(12) United States Patent
Metzger

(10) Patent No.: US 9,643,742 B2
(45) Date of Patent: *May 9, 2017

(54) ICE DISTRIBUTION SYSTEM AND METHOD

(71) Applicant: Reddy Ice Corporation, Dallas, TX (US)

(72) Inventor: Mark C. Metzger, Glendale, AZ (US)

(73) Assignee: REDDY ICE CORPORATION, Dallas, TX (US)

( * ) Notice: Subject to any disclaimer, the term of this patent is extended or adjusted under 35 U.S.C. 154(b) by 953 days.

This patent is subject to a terminal disclaimer.

(21) Appl. No.: 13/751,227

(22) Filed: Jan. 28, 2013

(65) Prior Publication Data
US 2013/0133296 A1   May 30, 2013

Related U.S. Application Data

(63) Continuation of application No. 12/130,946, filed on May 30, 2008, now Pat. No. 8,381,534.

(60) Provisional application No. 60/941,191, filed on May 31, 2007.

(51) Int. Cl.
| B65B 1/30 | (2006.01) |
| F25C 1/00 | (2006.01) |
| F25C 5/00 | (2006.01) |
| F25C 5/18 | (2006.01) |
| B65B 43/52 | (2006.01) |
| B65G 47/32 | (2006.01) |

(52) U.S. Cl.
CPC ............ B65B 1/30 (2013.01); F25C 1/00 (2013.01); F25C 5/007 (2013.01); F25C 5/187 (2013.01); B65B 43/52 (2013.01); B65G 47/32 (2013.01)

(58) Field of Classification Search
CPC ......... B65B 1/30; B65B 43/123; B65B 53/52; F25C 1/00; F25C 5/007; F25C 5/187; F25C 5/002; B65G 47/32
See application file for complete search history.

(56) References Cited

U.S. PATENT DOCUMENTS

| 2,116,300 A | 5/1938 | Campos |
| 2,584,726 A | 2/1952 | McOmber |
| 3,559,424 A | 2/1971 | Nelson |
| 3,712,019 A | 1/1973 | Lamka et al. |
| 3,789,570 A | 2/1974 | Mullins, Jr. |
| 3,807,193 A | 4/1974 | McKenney et al. |
| 3,897,676 A | 8/1975 | Membrino |

(Continued)

FOREIGN PATENT DOCUMENTS

| GB | 1459629 | 12/1976 |
| JP | 2006-105559 | 4/2006 |
| WO | WO 2004042294 | 5/2004 |
| WO | WO 2008/089762 | 7/2008 |

OTHER PUBLICATIONS

Louis K. Huynh, Notice of Allowance mailed Aug. 4, 2008 in U.S. Appl. No. 11/371,300, U.S. Patent Office.

(Continued)

Primary Examiner — Allen Flanigan
Assistant Examiner — Filip Zec
(74) Attorney, Agent, or Firm — Haynes and Boone, LLP

(57) ABSTRACT

An ice distribution system and method according to which ice-filled bags are distributed within a unit such as, for example, an ice merchandiser.

7 Claims, 11 Drawing Sheets

(56) References Cited

U.S. PATENT DOCUMENTS

| | | | |
|---|---|---|---|
| 3,913,343 A | 10/1975 | Rowland et al. |
| 3,918,266 A | 11/1975 | Gindy et al. |
| 3,969,909 A | 7/1976 | Barto et al. |
| 3,977,851 A | 8/1976 | Toya |
| 3,982,377 A | 9/1976 | Vanderpool |
| 4,013,199 A | 3/1977 | Brown |
| 4,027,459 A | 6/1977 | Nieskens et al. |
| 4,132,049 A | 1/1979 | Mullins, Jr. |
| 4,139,029 A | 2/1979 | Geraci |
| 4,348,872 A | 9/1982 | Hill |
| 4,350,004 A | 9/1982 | Tsujimoto et al. |
| 4,368,608 A | 1/1983 | Ray |
| 4,404,817 A | 9/1983 | Cox, III |
| 4,409,763 A | 10/1983 | Rydeen |
| 4,420,197 A | 12/1983 | Dreiling |
| 4,461,520 A | 7/1984 | Alneng |
| 4,612,779 A | 9/1986 | Hatton |
| 4,689,937 A | 9/1987 | Finan, Sr. et al. |
| 5,027,610 A | 7/1991 | Hara |
| 5,088,300 A | 2/1992 | Wessa |
| 5,109,651 A | 5/1992 | Stuart |
| 5,211,030 A | 5/1993 | Jameson |
| 5,277,016 A | 1/1994 | Williams et al. |
| 5,440,863 A | 8/1995 | Toya et al. |
| 5,458,851 A | 10/1995 | Schroeder et al. |
| 5,473,865 A | 12/1995 | Tanaka et al. |
| 5,484,209 A | 1/1996 | Weng |
| 5,489,769 A | 2/1996 | Kubo |
| 5,527,012 A | 6/1996 | Vinkel et al. |
| 5,555,743 A | 9/1996 | Hatanaka |
| 5,577,821 A | 11/1996 | Chu |
| 5,581,982 A | 12/1996 | Schroeder et al. |
| 5,630,310 A | 5/1997 | Chadwell |
| D379,880 S | 6/1997 | Stoeckli et al. |
| 5,660,506 A | 8/1997 | Berge et al. |
| 5,708,223 A | 1/1998 | Wyss |
| 5,722,750 A | 3/1998 | Chu |
| 5,761,888 A | 6/1998 | Haley |
| 5,813,196 A | 9/1998 | Page et al. |
| 5,822,955 A | 10/1998 | Woosley et al. |
| D407,092 S | 3/1999 | Weaver |
| 5,887,758 A | 3/1999 | Hawkes et al. |
| 6,044,658 A | 4/2000 | Ryu |
| 6,067,658 A | 5/2000 | Cho |
| 6,067,806 A | 5/2000 | Park |
| 6,082,350 A | 7/2000 | Crews et al. |
| 6,112,539 A | 9/2000 | Colberg |
| 6,112,558 A | 9/2000 | Wang |
| 6,119,441 A | 9/2000 | Lipes et al. |
| 6,134,907 A | 10/2000 | Mueller et al. |
| 6,189,293 B1 | 2/2001 | Kraft et al. |
| D440,255 S | 4/2001 | Dickson |
| 6,238,031 B1 | 5/2001 | Weng |
| 6,266,945 B1 | 7/2001 | Schroeder |
| 6,338,002 B1 | 1/2002 | Kuo |
| 6,354,338 B1 | 3/2002 | Takemoto |
| 6,377,863 B1 | 4/2002 | Koontz et al. |
| 6,405,553 B1 | 6/2002 | Willett |
| D460,489 S | 7/2002 | Dickson |
| 6,427,456 B2 | 8/2002 | Niwa et al. |
| 6,474,048 B1 | 11/2002 | Metzger et al. |
| 6,474,049 B1 | 11/2002 | Lipes et al. |
| 6,499,280 B1 | 12/2002 | Tsutsui |
| 6,502,416 B2 | 1/2003 | Kawasumi et al. |
| 6,506,428 B1 | 1/2003 | Berge et al. |
| 6,606,602 B1 | 8/2003 | Kolls |
| 6,705,107 B2 | 3/2004 | Schlosser et al. |
| 6,827,529 B1 | 12/2004 | Berge et al. |
| 6,850,996 B2 | 2/2005 | Wagner |
| 6,860,111 B2 | 3/2005 | Sanuki et al. |
| 6,862,866 B2 | 3/2005 | Jacobsen et al. |
| 6,904,946 B2 | 6/2005 | James |
| 6,932,124 B2 | 8/2005 | Dalton et al. |
| 6,938,428 B2 | 9/2005 | Onishi et al. |
| 6,953,132 B2 | 10/2005 | McCann et al. |
| 7,003,974 B1 | 2/2006 | Brooks |
| 7,013,657 B2 | 3/2006 | Hwang et al. |
| 7,062,892 B2 | 6/2006 | Metzger |
| 7,096,686 B2 | 8/2006 | Brunner et al. |
| 7,104,291 B2 | 9/2006 | Dalton et al. |
| 7,207,156 B2 | 4/2007 | Metzger |
| 7,275,645 B2 * | 10/2007 | Mallett ............. A61B 19/0248 |
| | | 206/366 |
| 7,426,812 B2 | 9/2008 | Metzger |
| 7,426,945 B2 | 9/2008 | Dalton et al. |
| 7,497,062 B2 | 3/2009 | Metzger |
| 7,624,773 B2 | 12/2009 | Maxwell |
| 7,735,527 B2 | 6/2010 | Dunn |
| 7,757,513 B2 | 7/2010 | Paine |
| 7,806,152 B2 | 10/2010 | Dalton et al. |
| 7,810,301 B2 | 10/2010 | Metzger |
| 7,849,660 B2 | 12/2010 | Metzger |
| 7,900,471 B2 | 3/2011 | Leske |
| 7,900,660 B2 | 3/2011 | Ladson |
| 7,958,918 B2 | 6/2011 | Ladson |
| 8,122,689 B2 | 2/2012 | Pape |
| 8,132,392 B2 | 3/2012 | Metzger |
| 8,245,488 B2 | 8/2012 | Dunn |
| 8,256,195 B2 | 9/2012 | Pape |
| 8,353,146 B1 | 1/2013 | Bareford et al. |
| 8,356,850 B1 | 1/2013 | Starkweather et al. |
| 8,381,534 B2 * | 2/2013 | Metzger .................... F25C 1/00 |
| | | 53/440 |
| 8,468,784 B2 | 6/2013 | Metzger |
| 8,484,935 B2 | 7/2013 | Leblanc et al. |
| 8,528,302 B1 | 9/2013 | Shaker et al. |
| 8,534,034 B1 | 9/2013 | Pape |
| 8,561,655 B2 | 10/2013 | Dalton et al. |
| 8,650,844 B2 | 2/2014 | Romanyszyn et al. |
| 8,689,523 B1 | 4/2014 | Shaker et al. |
| 8,739,557 B2 | 6/2014 | Metzger |
| 8,763,352 B2 | 7/2014 | Metzger |
| 8,800,305 B2 | 8/2014 | Pape et al. |
| 8,850,779 B2 | 10/2014 | Pandurangan et al. |
| 8,863,985 B2 | 10/2014 | Berge et al. |
| 8,935,906 B2 | 1/2015 | Pape |
| 2004/0084106 A1 | 5/2004 | James |
| 2004/0216481 A1 | 11/2004 | James et al. |
| 2005/0121099 A1 | 6/2005 | Hansen et al. |
| 2006/0005553 A1 | 1/2006 | Metzger |
| 2006/0005564 A1 | 1/2006 | Metzger |
| 2007/0175235 A1 | 8/2007 | Metzger |
| 2007/0209330 A1 | 9/2007 | Metzger |
| 2008/0022635 A1 | 1/2008 | Metzger |
| 2008/0047233 A1 | 2/2008 | Metzger |
| 2008/0110129 A1 | 5/2008 | LeBlanc et al. |
| 2008/0142398 A1 | 6/2008 | Carrigan et al. |
| 2008/0295462 A1 | 12/2008 | Metzger |
| 2010/0011710 A1 | 1/2010 | Pape |
| 2010/0024363 A1 | 2/2010 | Pape |
| 2010/0268375 A1 | 10/2010 | Pape |
| 2010/0313524 A1 | 12/2010 | Pape et al. |
| 2011/0041467 A1 | 2/2011 | Pape |
| 2011/0089201 A1 | 4/2011 | Pape |
| 2012/0070264 A1 | 3/2012 | Pape |
| 2012/0247066 A1 | 10/2012 | Dunn et al. |
| 2013/0092703 A1 | 4/2013 | Venet, III et al. |
| 2013/0133296 A1 | 5/2013 | Metzger |
| 2013/0255194 A1 | 10/2013 | Metzger |
| 2014/0033740 A1 | 2/2014 | Pape |
| 2014/0102582 A1 | 4/2014 | Venet, III et al. |
| 2014/0102583 A1 | 4/2014 | Venet, III et al. |
| 2014/0137513 A1 | 5/2014 | Shaker et al. |
| 2014/0199151 A1 | 7/2014 | Pape |
| 2014/0208777 A1 | 7/2014 | Metzger |

OTHER PUBLICATIONS

Louis K. Huynh, Notice of Allowance mailed Apr. 21, 2008 in U.S. Appl. No. 11/371,300, U.S. Patent Office.

Louis K. Huynh, Office Action mailed Mar. 26, 2007 in U.S. Appl. No. 11/371,300, U.S. Patent Office.

(56) References Cited

OTHER PUBLICATIONS

Louis K. Huynh, Office Action/Restriction Requirement mailed Feb. 12, 2007 in U.S. Appl. No. 11/371,300, U.S. Patent Office.
J. Casimer Jacyna, Office Action mailed Jul. 18, 2007 in U.S. Appl. No. 10/701,984, U.S. Patent Office.
Derek L. Woods, Decision on Petition mailed Apr. 20, 2007 in U.S. Appl. No. 10/701,984, U.S. Patent Office.
Derek L. Woods, Decision on Petition mailed Nov. 8, 2006 in U.S. Appl. No. 10/701,984, U.S. Patent Office.
J. Casimer Jacyna, Notice of Abandonment mailed Mar. 7,2005 in U.S. Appl. No. 10/701,984, U.S. Patent Office.
J. Casimer Jacyna, Office Action mailed Jul. 12, 2004 in U.S. Appl. No. 10/701,984, U.S. Patent Office.
Louis K. Huynh, Office Action/Restriction Requirement mailed Apr. 21, 2008 in U.S. Appl. No. 11/931,324, U.S. Patent Office.
Louis K. Huynh, Notice of Allowance mailed Oct. 17, 2008 in U.S. Appl. No. 11/931,324, U.S. Patent Office.
Louis K. Huynh, Notice of Allowance mailed Jun. 27, 2008 in U.S. Appl. No. 11/931,324, U.S. Patent Office.
International Search Report and Written Opinion mailed Apr. 15, 2011 by the ISA/US in connection with PCT/US2011/023122.
Christopher R. Zerphey, Office Action issued Nov. 13, 2012 in U.S. Appl. No. 12/914,681, U.S. Patent Office.
Christopher R. Zerphey, Office Action issued Feb. 26, 2013 in U.S. Appl. No. 12/914,681, U.S. Patent Office.
Christopher R. Zerphey, Advisory Action issued May 1, 2013 in U.S. Appl. No. 12/914,681, U.S. Patent Office.
Christopher R. Zerphey, Office Action issued Jun. 26, 2013 in U.S. Appl. No. 12/914,681, U.S. Patent Office.
Christopher R. Zerphey, Office Action issued Oct. 21,2013 in U.S. Appl. No. 12/914,681, U.S. Patent Office.
Lakiya G. Rogers, Office Action/Restriction Requirement mailed Feb. 14, 2012 in U.S. Appl. No. 12/130,946, U.S. Patent Office.
Lakiya G. Rogers, Office Action mailed May 7,2012 in U.S. Appl. No. 12/130,946, U.S. Patent Office.
Lakiya G. Rogers, Notice of Allowance mailed Oct. 26, 2012 in U.S. Appl. No. 12/130,946, U.S. Patent Office.

\* cited by examiner

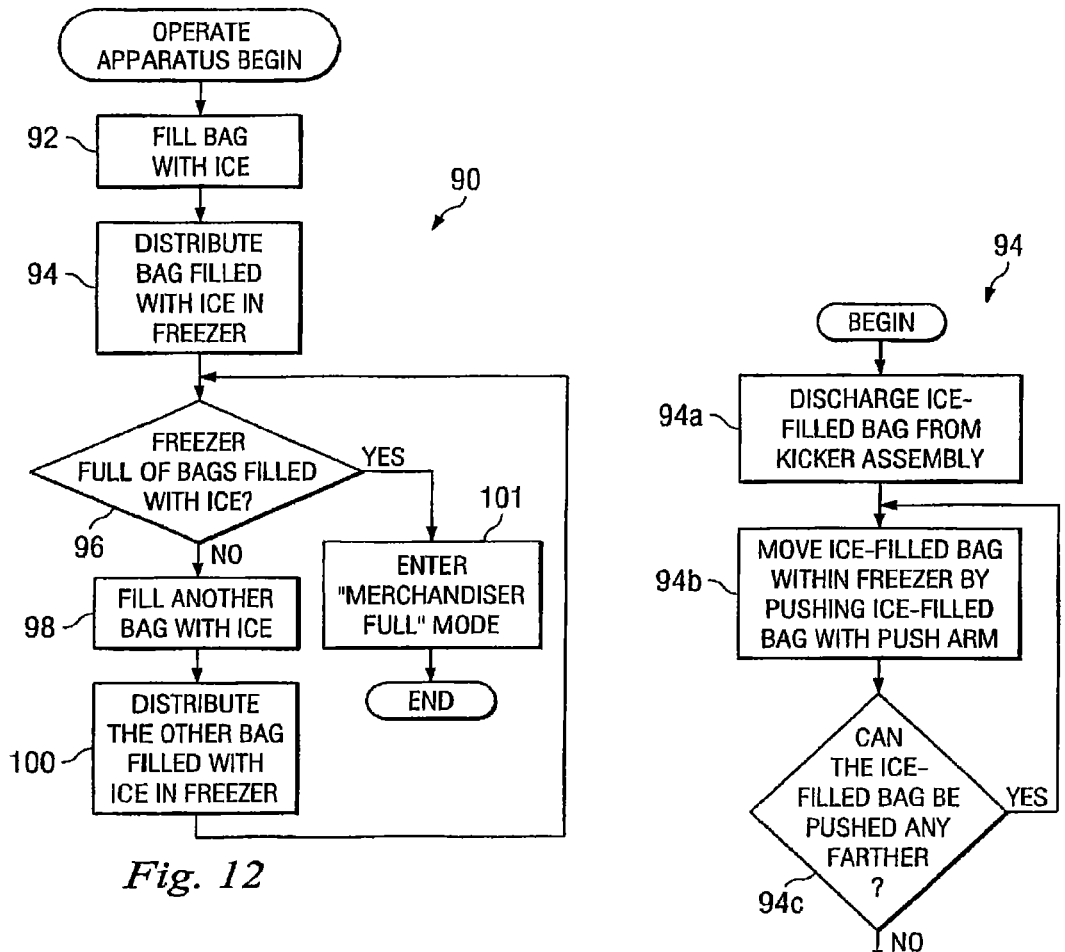
Fig. 12
Fig. 13
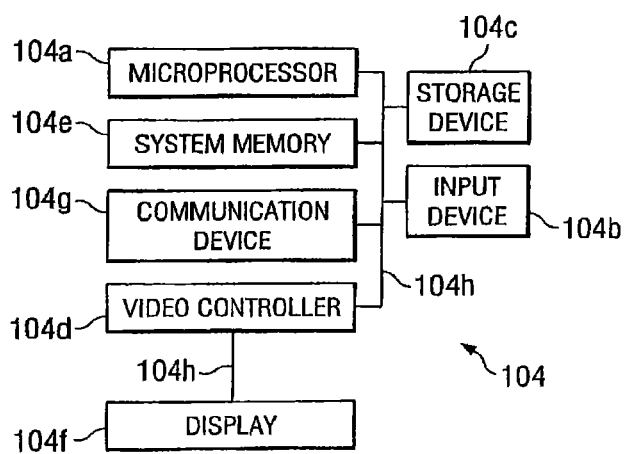
Fig. 15

ICE DISTRIBUTION SYSTEM AND METHOD

CROSS-REFERENCE TO RELATED APPLICATIONS

This application is a continuation of U.S. patent application Ser. No. 12/130,946, filed on May 30, 2008, which claims the benefit of the filing date of U.S. patent application No. 60/941,191, filed on May 31, 2007, the entire disclosures of which are incorporated herein by reference.

This application is related to (1) U.S. patent application Ser. No. 10/701,984, filed on Nov. 6, 2003; (2) U.S. patent application No. 60/647,221, filed on Jan. 26, 2005; (3) U.S. patent application No. 60/659,600, filed on Mar. 7, 2005; (4) U.S. patent application Ser. No. 11/371,300, filed on Mar. 9, 2006; (5) U.S. patent application No. 60/837,374, filed on Aug. 11, 2006; (6) U.S. patent application No. 60/941,191, filed on May 31, 2007; (7) U.S. patent application Ser. No. 11/837,320, filed on Aug. 10, 2007; and (8) U.S. patent application Ser. No. 11/931,324, filed on Oct. 31, 2007, the disclosures of which are incorporated herein by reference.

BACKGROUND

The present disclosure relates in general to ice and in particular to a system and method for distributing ice-filled bags within a unit such as, for example, an ice storage unit, a freezer, or an ice merchandiser.

BRIEF DESCRIPTION OF THE DRAWINGS

FIG. 12 is a flow chart illustration of a method of operating the apparatus of FIG. 11 according to an exemplary embodiment.

FIG. 13 is a flow chart illustration of a step of the method of FIG. 12 according to an exemplary embodiment.

FIG. 15 is a diagrammatic illustration of a node for implementing one or more exemplary embodiments of the present disclosure.

DETAILED DESCRIPTION

Figure 1:
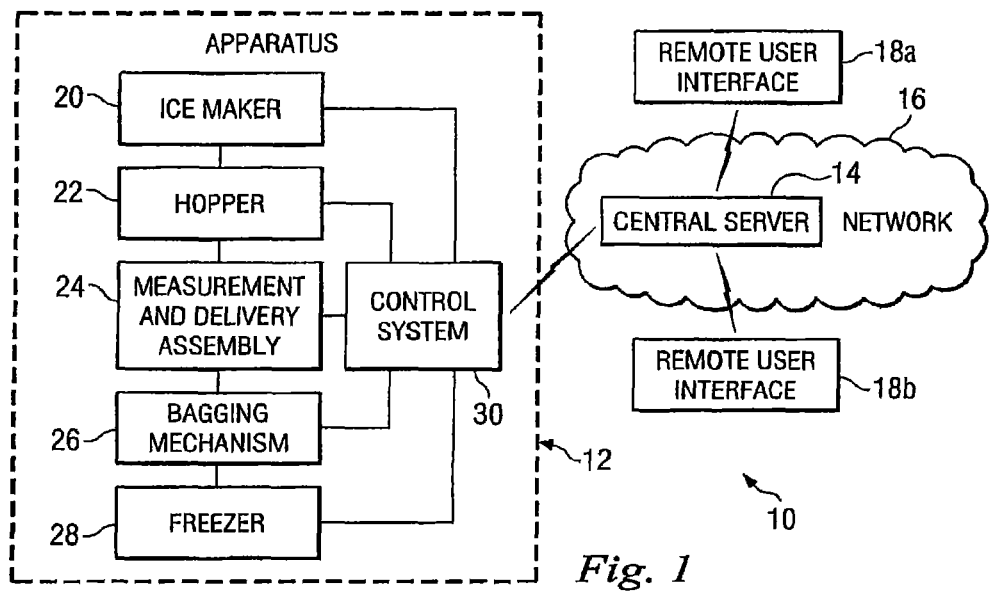
FIG. 1 is a diagrammatic illustration of a system according to an exemplary embodiment, the system including an apparatus, a central sever and a plurality of remote user interfaces, the apparatus including an ice maker, a hopper, a measurement and delivery assembly, a bagging mechanism, an ice merchandiser or freezer, and a control system.

In an exemplary embodiment, as illustrated in FIG. 1, a system is generally referred to by the reference numeral 10 and includes an apparatus 12 operably coupled to a central server 14 via a network 16. Remote user interfaces 18a and 18b are operably coupled to, and are adapted to be in two-way communication with, the central server 14 via the network 16. In several exemplary embodiments, the network 16 includes the Internet, any type of local area network, any type of wide area network, any type of wireless network and/or any combination thereof. In several exemplary embodiments, each of the remote user interfaces 18a and 18b includes a personal computer, a personal digital assistant, a cellular telephone, other types of computing devices and/or any combination thereof. In several exemplary embodiments, the central server 14 includes a processor and a computer readable medium or memory operably coupled thereto for storing instructions accessible to, and executable by, the processor.

In an exemplary embodiment, with continuing reference to FIG. 1, the apparatus 12 includes an ice maker 20 and a hopper 22 operably coupled thereto. A measurement and delivery assembly 24 is operably coupled to the hopper 22, and a bagging mechanism 26 is operably coupled to the measurement and delivery assembly 24. A temperature-controlled storage unit such as, for example, a freezer 28, is operably coupled to the bagging mechanism 26. A control system 30 is operably coupled to the ice maker 20, the hopper 22, the measurement and delivery assembly 24, the bagging mechanism 26 and the freezer 28. In an exemplary embodiment, the freezer 28 is an ice merchandiser.

In an exemplary embodiment, the measurement and delivery assembly 24 is, or at least includes in whole or in part, one or more of the embodiments of measurement and delivery assemblies disclosed in U.S. patent application Ser. No. 10/701,984, filed on Nov. 6, 2003, the disclosure of which is incorporated herein by reference. In an exemplary embodiment, the measurement and delivery assembly 24 is, or at least includes in whole or in part, one or more of the embodiments of measurement and delivery assemblies disclosed in U.S. patent application Ser. No. 11/371,300, filed on Mar. 9, 2006, the disclosure of which is incorporated herein by reference, such as, for example, the drawer section disclosed in U.S. patent application Ser. No. 11/371,300. In an exemplary embodiment, the measurement and delivery assembly 24 is, or at least includes in whole or in part, one or more of the embodiments of measurement and delivery assemblies disclosed in U.S. patent application Ser. No. 11/837,320, filed on Aug. 10, 2007, the disclosure of which is incorporated herein by reference, such as, for example, the compartment assembly disclosed in U.S. patent application Ser. No. 11/837,320. In an exemplary embodiment, the measurement and delivery assembly 24 is, or at least includes in whole or in part, one or more of the embodiments of measurement and delivery assemblies disclosed in U.S. patent application No. 60/659,600, filed on Mar. 7, 2005; U.S. patent application No. 60/837,374, filed on Aug. 11, 2006; U.S. patent application No. 60/941,191, filed on May 31, 2007; and U.S. patent application Ser. No. 11/931,324, filed on Oct. 31, 2007, the disclosures of which are incorporated herein by reference.

Figure 2:
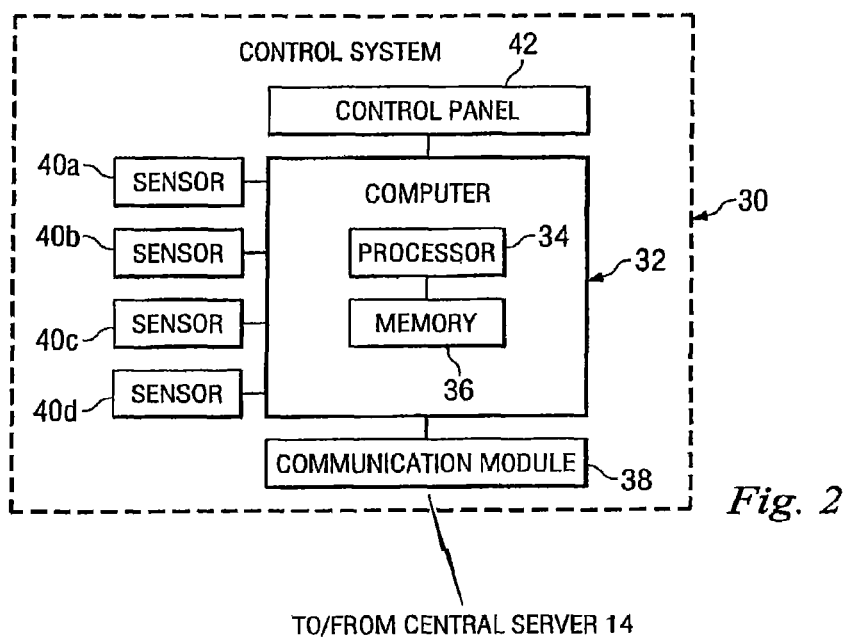
FIG. 2 is a diagrammatic illustration of the control system of FIG. 1 according to an exemplary embodiment.

In an exemplary embodiment, as illustrated in FIG. 2 with continuing reference to FIG. 1, the control system 30 includes a computer 32 including a processor 34 and a computer readable medium or memory 36 operably coupled thereto. In an exemplary embodiment, instructions accessible to, and executable by, the processor 34 are stored in the memory 36. In an exemplary embodiment, the memory 36 includes one or more databases and/or one or more data structures stored therein. A communication module 38 is operably coupled to the computer 32, and is adapted to be in two-way communication with the central server 14 via the network 16. Sensors 40a, 40b, 40c and 40d are operably coupled to the computer 32. A control panel 42 is operably coupled to the computer 32.

In an exemplary embodiment, each of the sensors 40a, 40b, 40c and 40d includes one or more sensors. In an exemplary embodiment, the sensors 40a, 40b, 40c and 40d are distributed throughout the apparatus 12. In an exemplary embodiment, the sensors 40a, 40b, 40c and 40d are positioned in or more different locations in one or more of the ice maker 20, the hopper 22, the measurement and delivery assembly 24, the bagging mechanism 26, the freezer 28, and the control system 30.

In several exemplary embodiments, the computer 32 includes a data acquisition unit that is adapted to convert, condition and/or process signals transmitted by the sensors 40a, 40b, 40c and 40d, and one or more other sensors operably coupled to the computer 32. In several exemplary embodiments, the control panel 42 includes one or more input devices such as, for example, one or more keypads, one or more voice-recognition systems, one or more touch-screen displays and/or any combination thereof. In several exemplary embodiments, the control panel 42 includes one or more output devices such as, for example, one or more displays such as, for example, one or more digital displays, one or more liquid crystal displays and/or any combination thereof, one or more printers and/or any combination thereof. In several exemplary embodiments, the control panel 42 includes one or more card readers, one or more graphical-user interfaces and/or other types of user interfaces, one or more digital ports, one or more analog ports, one or more signal ports, one or more alarms, and/or any combination thereof. In several exemplary embodiments, the computer 32 and/or the processor 34 includes, for example, one or more of the following: a conventional programmable general purpose controller, an application specific integrated circuit (ASIC), other conventional controller devices and/or any combination thereof.

Figure 3:
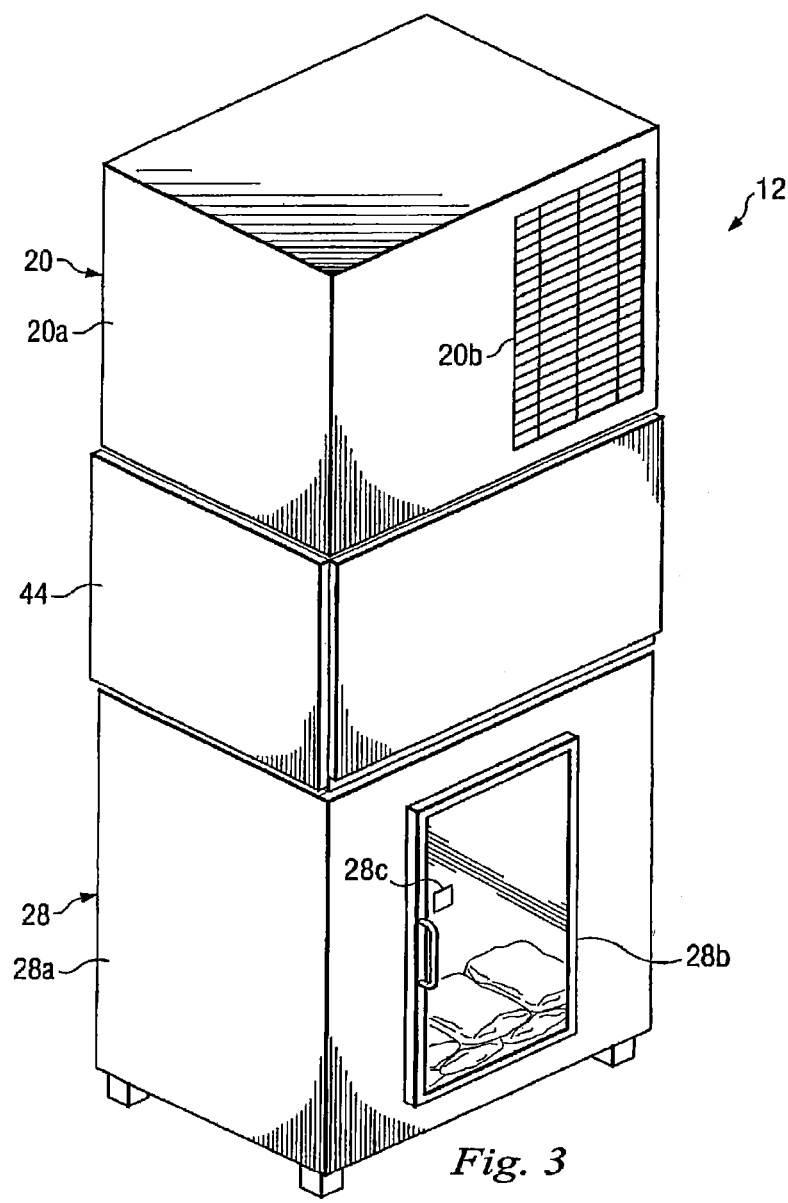
FIG. 3 is a perspective view of the apparatus of FIG. 1 according to an exemplary embodiment.

In an exemplary embodiment, as illustrated in FIG. 3 with continuing reference to FIGS. 1 and 2, the ice maker 20 includes an enclosure 20a and a grill panel 20b. The hopper 22, the measurement and delivery assembly 24, the bagging mechanism 26, and the control panel 42 of the control system 30 are disposed in, and/or coupled to, an enclosure 44, which encloses at least respective portions of the hopper 22, the measurement and delivery assembly 24, the bagging mechanism 26, and the control panel 42. The freezer 28 includes an enclosure 28a and a door 28b coupled thereto. In an exemplary embodiment, the freezer 28 further includes a sensor 28c for determining if the door 28b is open or closed, which sensor is coupled to the door 28b and operably coupled to the computer 32.

Figure 4:
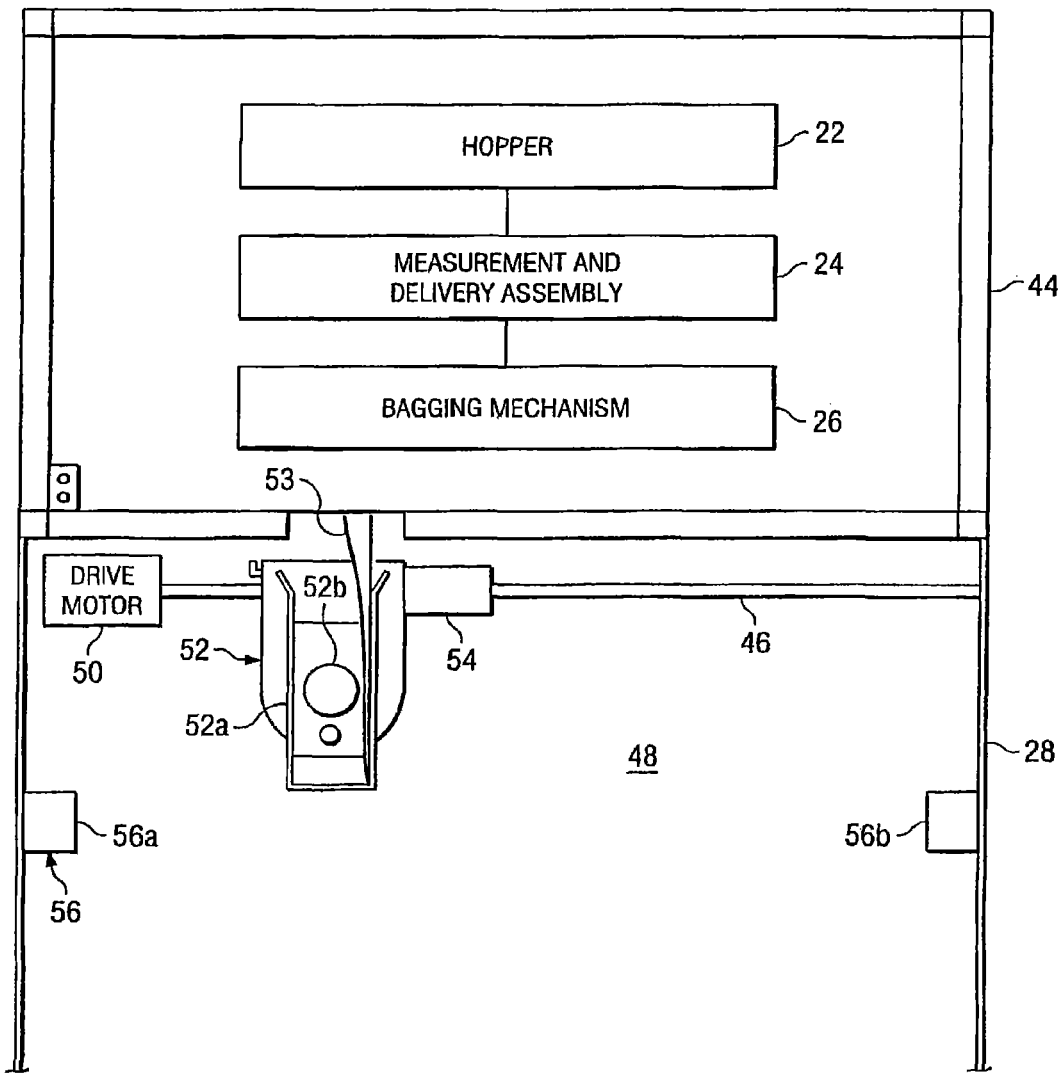
FIG. 4 is a partial diagrammatic illustration/partial sectional view of a portion of the apparatus of FIG. 3.

In an exemplary embodiment, as illustrated in FIG. 4 with continuing reference to FIGS. 1-3, a pair of linear tracks 46 are coupled to respective upper portions of opposing inside walls of the freezer 28. In an exemplary embodiment, the linear tracks 46 are coupled to, and extend between, respective upper portions of the inside front and back walls of the freezer 28. In an exemplary embodiment, the linear tracks 46 are coupled to, and extend between, respective upper portions of the opposing inside side walls of the freezer 28. In an exemplary embodiment, the linear tracks 46 are coupled to the inside ceiling wall of the freezer 28. In an exemplary embodiment, the linear tracks 46 extend across the majority of an internal region 48 defined by the freezer 28, in a front-to-back, side-to-side, or diagonal direction. In an exemplary embodiment, the linear tracks 46 are spaced in a parallel relation within the internal region 48. In an exemplary embodiment, instead of a pair of linear tracks 46, the apparatus 12 includes only one linear track. In an exemplary embodiment, instead of a pair of linear tracks 46, the apparatus 12 includes three or more linear tracks. In an exemplary embodiment, instead of only linear portions, the tracks 46 include one or more linear portions, one or more curved portions, and/or any combination thereof.

A drive motor 50 is operably coupled to the linear tracks 46, and is adapted to drive the tracks 46, under conditions to be described below. A movable kicker assembly 52, which includes a bag basket 52a and a rotator motor 52b operably coupled thereto, is coupled to the linear tracks 46. In an exemplary embodiment, the tracks 46 are spaced in a parallel relation, and one of the tracks 46 is coupled to the kicker assembly 52 at one location, and the other of the tracks 46 is coupled to the kicker assembly 52 at another location. In an exemplary embodiment, the tracks 46 are spaced in a parallel relation, and the tracks 46 are coupled to the kicker assembly 52 at either side thereof, respectively. The bag basket 52a is adapted to receive a bag 53 from the bagging mechanism 26, and hold the bag 53 while the bag 53 is filled with ice during the operation of the measurement and delivery assembly 24 and the bagging mechanism 26, under conditions to be described below.

A proximity sensor 54 is coupled to the kicker assembly 52, and is adapted to determine whether an object is immediately below and to the right (as viewed in FIG. 4) of the kicker assembly 52, under conditions to be described below. In an exemplary embodiment, the proximity sensor 54 includes an electric eye. A sensor 56 is mounted to an inside wall of the freezer 28, and is vertically positioned below the kicker assembly 52. In an exemplary embodiment, the sensor 56 is a reflective sensor. In an exemplary embodiment, the sensor 56 includes a photocell 56a and a reflector 56b positioned opposite the photocell 56a on the opposing inside wall of the freezer 28.

In an exemplary embodiment, the drive motor 50, the rotator motor 52b, the sensor 54, and the sensor 56 are operably coupled to the computer 32. In an exemplary embodiment, one or more of the drive motor 50, the rotator motor 52b, the sensor 54, and the sensor 56 are operably coupled to the computer 32.

Figure 5:
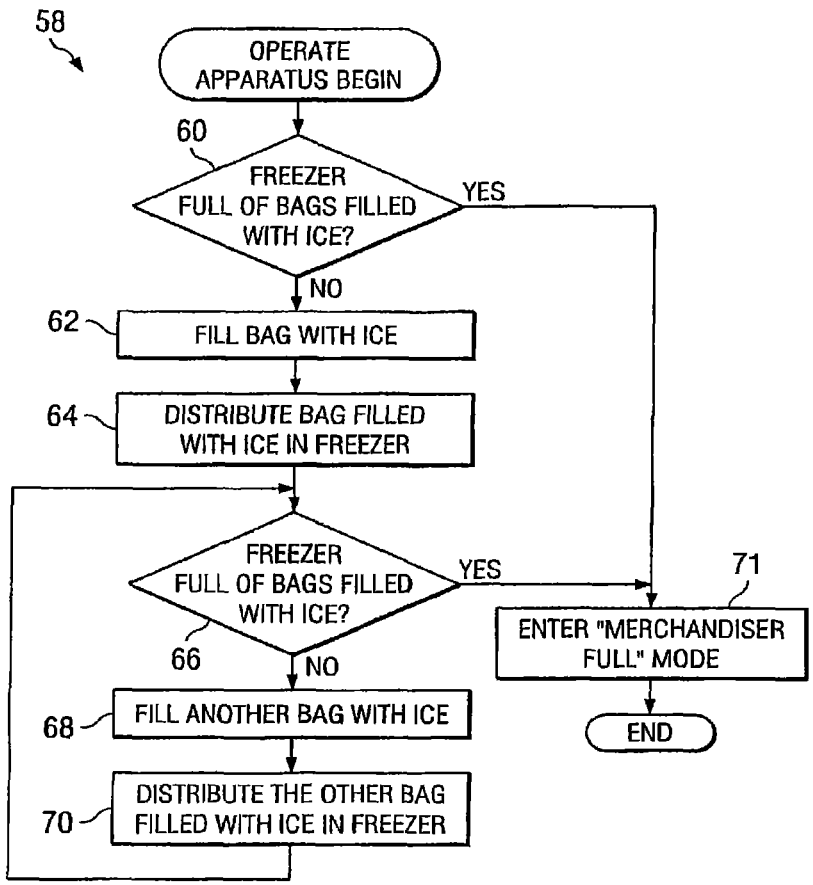
FIG. 5 is a flow chart illustration of a method of operating the apparatus of FIGS. 1, 3 and 4 according to an exemplary embodiment.

In an exemplary embodiment, as illustrated in FIG. 5 with continuing reference to FIGS. 1-4, a method 58 of operating the apparatus 12 includes determining in step 60 whether the freezer 28 is filled with bags filled with ice. If not, then a bag is filled with ice in step 62, and the bag filled with ice is distributed in the freezer 28 in step 64. In step 66, it is again determined whether the freezer 28 is filled with bags filled with ice. If not, then another bag is filled with ice in step 68, and the other bag filled with ice is distributed in the freezer 28 in step 70. The steps 66, 68 and 70 are repeated until it is determined in the step 66 that the freezer 28 is filled with bags filled with ice, at which point the apparatus 12 enters in step 71 a "merchandiser full" mode in which the apparatus 12 ceases automatically bagging any more ice, and/or at least ceases introducing any more ice-filled bags into the freezer 28. If it is determined in the step 60 that the freezer 28 is filled with bags filled with ice in the step 60, then the apparatus 12 enters the "merchandiser full" mode in the step 71. In an exemplary embodiment, the method 58 is repeated when a predetermined condition is satisfied; examples of such a predetermined condition include, but are not limited to, the passage of a predetermined amount of time, the detection of the opening of the door 28b of the freezer 28 using the sensor 28c, and/or any combination thereof.

In an exemplary embodiment, to determine in the step 60 whether the freezer 28 is filled with bags filled with ice, the sensor 56 operates to determine whether bags filled with ice have been stacked in the freezer 28 to such a degree that the one or more stacks of bags filled with ice would interfere with, or block, the movement of the kicker assembly 52 along the tracks 46. In an exemplary embodiment, if respective portions of one or more stacks of bags filled with ice are disposed between the photocell 56a and the reflector 56b, then it is determined in the step 60 that the freezer 28 is filled with bags filled with ice, and the apparatus 12 enters the "merchandiser full" mode in the step 71, at which point the apparatus 12 ceases automatically bagging any more ice, and/or at least ceases introducing any more ice-filled bags into the freezer 28. In an exemplary embodiment, if the sensor 56 determines that the freezer 28 is filled with bags filled with ice in the step 60, then, during the step 71, the sensor 56 further sends one or more signals to the computer 32, which, in response to receiving the one or more signals from the sensor 56, sends one or more signals to one or more of the measurement and delivery assembly 24 and the bagging mechanism 26, thereby causing the apparatus 12 to cease automatically bagging any more ice, and/or to at least cease introducing any more ice-filled bags into the freezer 28.

As noted above, in an exemplary embodiment, after the apparatus 12 has entered the "merchandiser full" mode in the step 71, as described above, the method 58 is repeated when a predetermined condition is satisfied; examples of such a predetermined condition include, but are not limited to, the passage of a predetermined amount of time, the detection of the opening of the door 28b of the freezer 28 using the sensor 28c, and/or any combination thereof.

Figure 6:
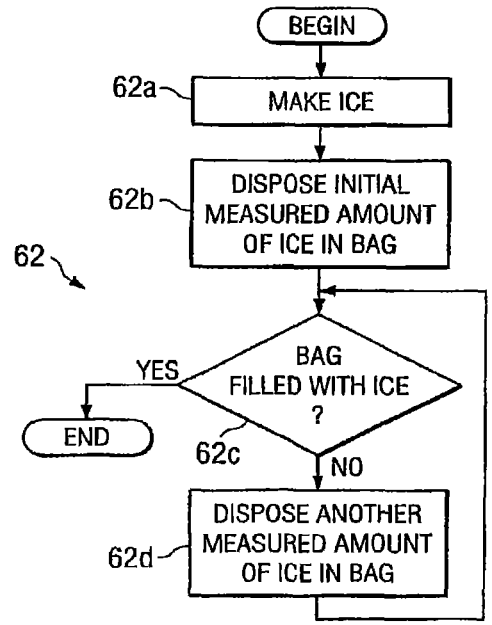
FIG. 6 is a flow chart illustration of a step of the method of FIG. 5 according to an exemplary embodiment.
Figure 7:
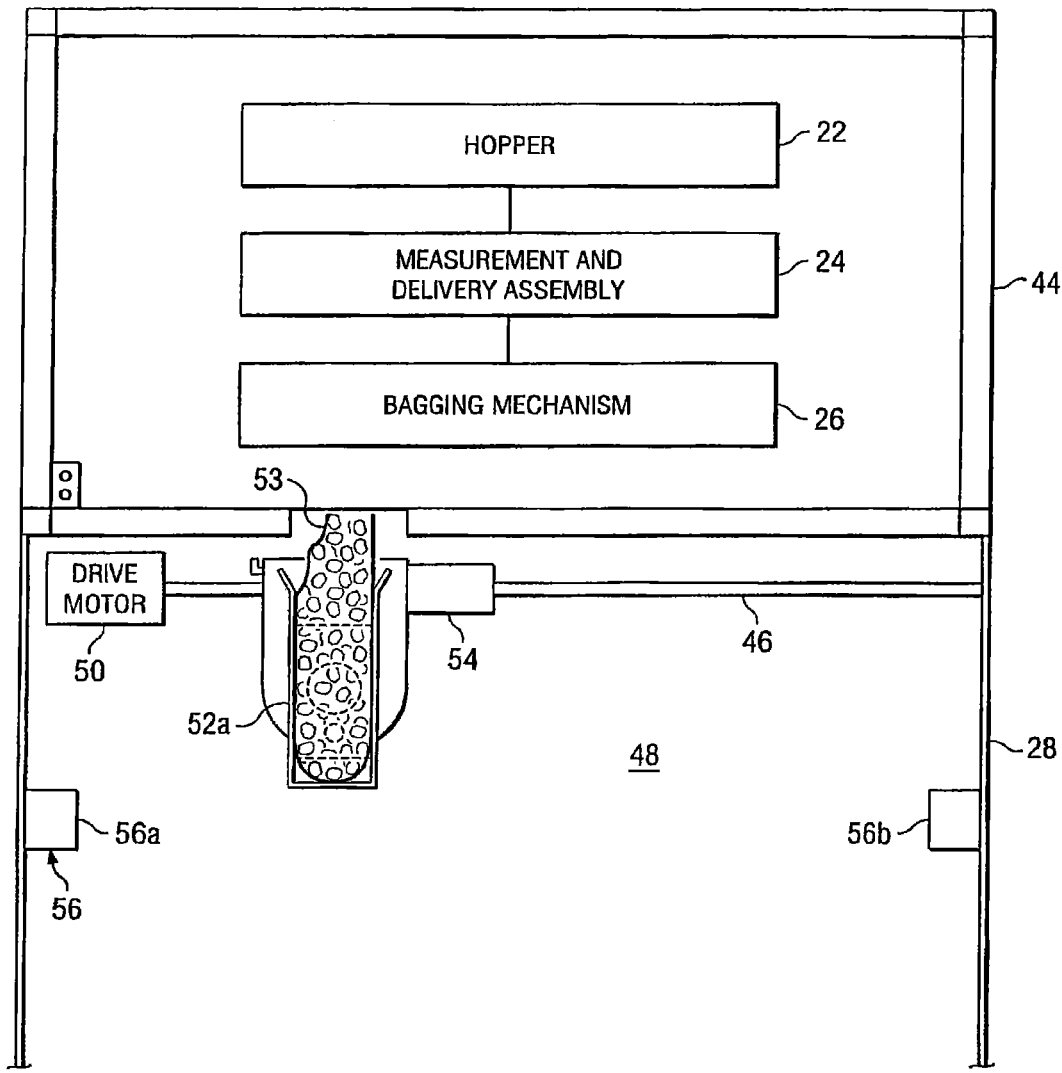
FIG. 7 is a partial diagrammatic illustration/partial sectional view of the apparatus of FIGS. 1, 3 and 4 in an operational mode during the execution of the step of FIG. 6, according to an exemplary embodiment.

In an exemplary embodiment, as illustrated in FIGS. 6 and 7 with continuing reference to FIGS. 1-5, to fill the bag 53 with ice in the step 62, the ice is made in step 62a. In an exemplary embodiment, the ice is made in the step 62a before, during or after one or more of the steps 60, 62, 64, 66, 68 and 70 of the method 58. In an exemplary embodiment, the ice is made in the step 62a using the ice maker 20. Before, during or after the ice is made in the step 62a, the kicker assembly 52 is positioned in the freezer 28 in its home position relative to the bagging mechanism 26, that is, in its position configured to receive the bag 53 in the basket 52a, and to further receive ice into the bag 53 while the bag 53 is disposed in the basket 52a. After the ice is made in the step 62a, an initial amount of ice is measured and disposed in the bag 53 in step 62b. In an exemplary embodiment, the initial amount of ice is measured and disposed in the bag 53 in the step 62b using the hopper 22, the measurement and delivery assembly 24, and the bagging mechanism 26, with the hopper 22 receiving the ice from the ice maker 20, the measurement and delivery assembly 24 measuring and delivering an amount of the ice into the bag 53, and the bagging mechanism 26 providing the bag 53. After the step 62b, it is determined whether the bag 53 is filled with ice in step 62c. If not, then another measured amount of ice is disposed in the bag 53 in step 62d using the hopper 22 and the measurement and delivery assembly 24. The steps 62c and 62d are repeated until the bag 53 is filled with ice while remaining disposed in the basket 52a of the kicker assembly 52, as shown in FIG. 7. In several exemplary embodiments, one or more of the steps 62a, 62b, 62c and 62d are executed in whole or in part in accordance with aspects of one or more of the following: (1) U.S. patent application Ser. No. 10/701,984, filed on Nov. 6, 2003; (2) U.S. patent application No. 60/647,221, filed on Jan. 26, 2005; (3) U.S. patent application No. 60/659,600, filed on Mar. 7, 2005; (4) U.S. patent application Ser. No. 11/371,300, filed on Mar. 9, 2006; (5) U.S. patent application No. 60/837,374, filed on Aug. 11, 2006; (6) U.S. patent application No. 60/941,191, filed on May 31, 2007; (7) U.S. patent application Ser. No. 11/837,320, filed on Aug. 10, 2007; and (8) U.S. patent application Ser. No. 11/931,324, filed on Oct. 31, 2007, the disclosures of which are incorporated herein by reference.

Figure 8:
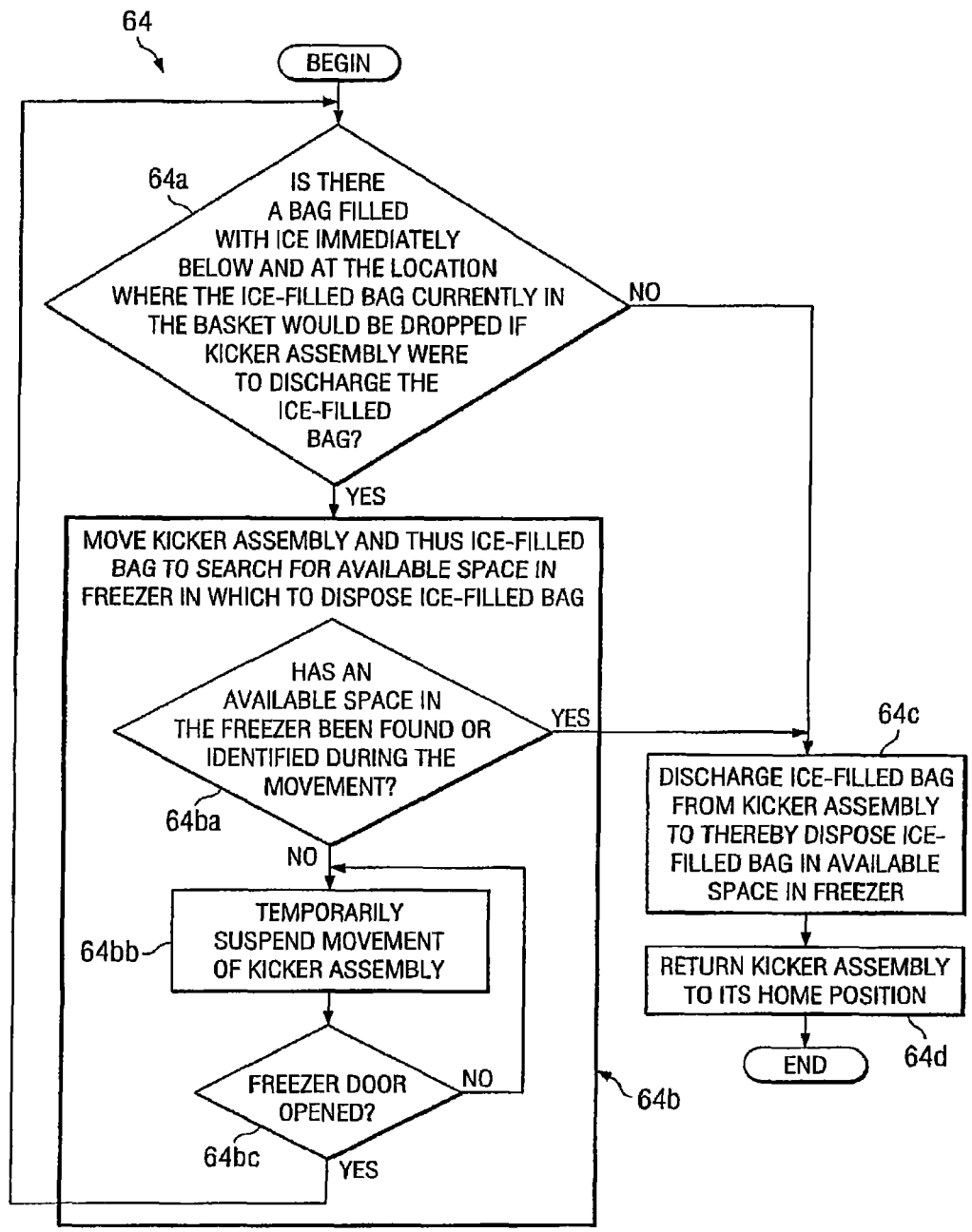
FIG. 8 is a flow chart illustration of another step of the method of FIG. 5 according to an exemplary embodiment.
Figure 9:
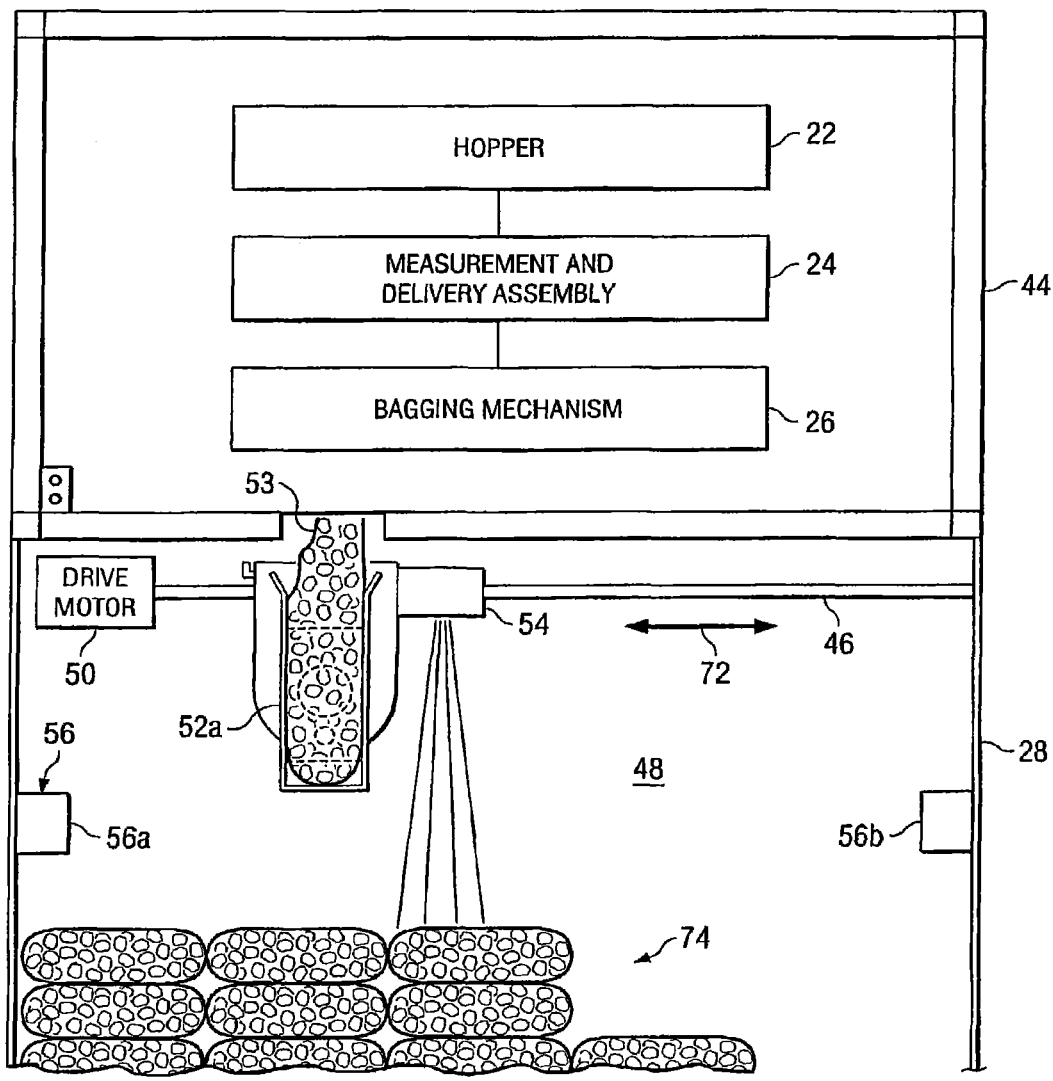
FIG. 9 is a view similar to that of FIG. 7, but depicting the apparatus of FIGS. 1, 3 and 4 in another operational mode during the execution of the step of FIG. 8, according to an exemplary embodiment.
Figure 10:
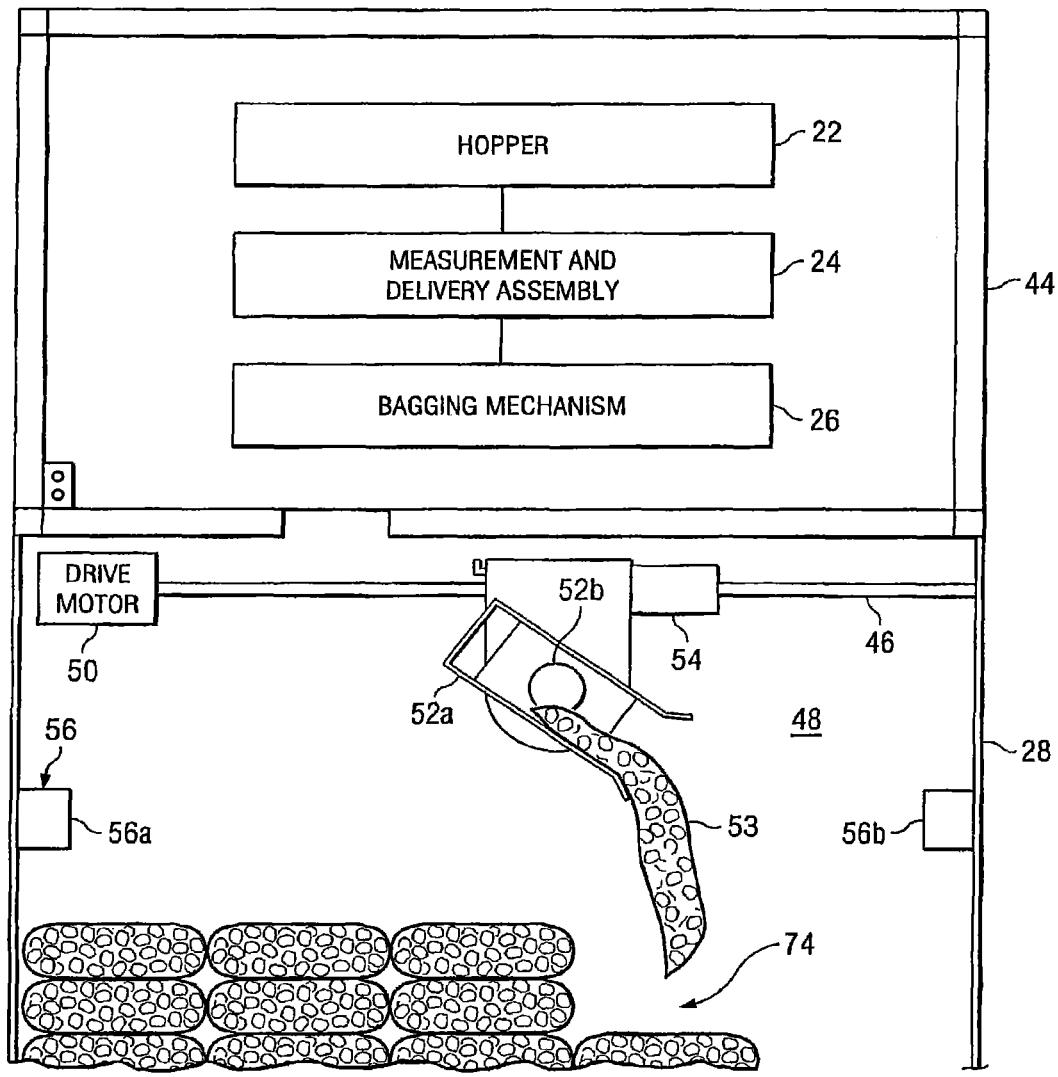
FIG. 10 is a view similar to that of FIG. 9, but depicting the apparatus of FIGS. 1, 3 and 4 in yet another operational mode during the execution of the step of FIG. 8, according to an exemplary embodiment.

In an exemplary embodiment, as illustrated in FIGS. 8, 9 and 10 with continuing reference to FIGS. 1-7, to distribute the ice-filled bag 53 in the freezer 28 in the step 64 of the method 58, the sensor 54 determines in step 64a if there is a bag filled with ice immediately below and at the location where the ice-filled bag 53 currently in the basket 52a would be dropped if the kicker assembly 52 were to discharge the ice-filled bag 53. In an exemplary embodiment, the sensor 54 determines in the step 64a if there is a bag filled with ice immediately below and at the location where the ice-filled bag 53 currently in the basket 52a would be dropped if the motor 52b were to rotate the basket 52a. In an exemplary embodiment, in the step 64a, the sensor 54 determines if there is a bag filled with ice immediately below and to the right of the kicker assembly 52, as viewed in FIG. 9, because, in an exemplary embodiment, to the right of the kicker assembly 52 is the location at which the ice-filled bag 53 currently in the basket 52a would be dropped if the motor 52b were to rotate the basket 52a in a clockwise direction as viewed in FIG. 9.

If it is determined in the step 64a that there is indeed an ice-filled bag immediately below and at the location where the ice-filled bag 53 currently in the basket 52a would be dropped if the kicker assembly 52 were to discharge the ice-filled bag 53, then the kicker assembly 52 moves along the tracks 46 in step 64b, thereby searching for an available space in the freezer 28 in which the ice-filled bag 53 can be disposed. In an exemplary embodiment, if it is determined in the step 64a that there is indeed an ice-filled bag immediately below and at the location where the ice-filled bag 53 currently in the basket 52a would be dropped if the motor 52b were to rotate the basket 52a, then the drive motor 50 drives the tracks 46, thereby causing the kicker assembly 52 to move along the tracks 46 in the step 64b. During the movement of the kicker assembly 52 in the step 64b, the sensor 54 continues to determine if there is an ice-filled bag immediately below and at the location where the ice-filled bag 53 currently in the basket 52a would be dropped if the motor 52b were to rotate the basket 52a. In an exemplary embodiment, during the step 64b, the kicker assembly 52 moves back and forth along the tracks 46, as indicated by an arrow 72 in FIG. 9, until the sensor 54 determines that there is no ice-filled bag immediately below and at the location where the ice-filled bag 53 currently in the basket 52*a* would be dropped if the motor 52*b* were to rotate the basket 52*a*, thereby identifying an available space in the freezer 28 for the ice-filled bag 53 currently in the basket 52*a*, such as, for example, an available space 74 in FIG. 9. In several exemplary embodiments, the available space 74 ranges vertically from a space on the floor of the freezer 28 to a space immediately below the sensor 56 and on another ice-filled bag.

In an exemplary embodiment, during and/or after the movement of the kicker assembly 52 in the step 64*b*, it is determined in step 64*ba* whether an available space in the freezer 28 has been found or identified during the movement. In an exemplary embodiment, during and/or after the movement of the kicker assembly 52 in the step 64*b*, it is determined in the step 64*ba* whether the kicker assembly 52 has moved for a predetermined amount of time in the step 64*b*, and/or the kicker assembly 52 has moved over a predetermined path and/or distance along the tracks 46 in the step 64*b*, and an available space in the freezer 28 has still not been found or identified during the step 64*b*, notwithstanding the determination in the step 60. If an available space has not been found during the step 64*b* as determined in the step 64*ba*, then the apparatus 12 enters the "merchandiser full" mode, as described above, and movement of the kicker assembly 52 is temporarily suspended in step 64*bb*. It is then determined in step 64*bc* whether the door 28*b* of the freezer 28 has been opened using the sensor 28*c*. If so, then step 64*a* is repeated, and possibly the step 64*b* is repeated. In an exemplary embodiment, instead of, or in addition to repeating the step 64*a* in response to detecting the opening of the door 28*b* in the step 64*bc*, the step 64*a* and possibly the step 64*b* are repeated in response to the passage of another predetermined amount of time.

If it is determined in the step 64*a* that there is no ice-filled bag immediately below and at the location where the ice-filled bag 53 currently in the basket 52*a* would be dropped if the kicker assembly 52 were to discharge the ice-filled bag 53, then in step 64*c* the kicker assembly 52 discharges the ice-filled bag 53 to thereby dispose the ice-filled bag 53 in the available space. In an exemplary embodiment, if it is determined in the step 64*a* that there is no ice-filled bag immediately below and at the location where the ice-filled bag 53 currently in the basket 52*a* would be dropped if the motor 52*b* were to rotate the basket 52*a*, then in the step 64*c* the rotator motor 52*b* is activated to cause the bag basket 52*a* to rotate clockwise, as viewed in FIG. 10. In response to the clockwise rotation of the bag basket 52*a*, the ice-filled bag 53 falls into and is disposed in the available space 74 in the freezer 28, as viewed in FIG. 10. After the step 64*c*, the kicker assembly 52 is returned to its home position, as described above, in step 64*d*. In an exemplary embodiment, before, during or after the step 64*d*, the motor 52*b* is activated to cause the bag basket 52*a* to rotate back to its upright position as shown in, for example, FIGS. 4, 7 and 9. In an exemplary embodiment, the control system 30 controls one or more of the movement of the kicker assembly 52 in the steps 64*b* and 64*d*, and the rotation of the bag basket 52*b* in the step 64*c*.

In an exemplary embodiment, the step 66 of the method 58 is substantially identical to the step 60 of the method 58, as described above, and therefore the step 66 will not be described in further detail. In an exemplary embodiment, the apparatus 12 enters in the step 71 the "merchandiser full" mode in response to determining that the freezer 28 is filled with ice-filled bags in the step 66. As noted above, in an exemplary embodiment, the method 58 is repeated when a predetermined condition is satisfied; examples of such a predetermined condition include, but are not limited to, the passage of a predetermined amount of time, the detection of the opening of the door 28*b* of the freezer 28 using the sensor 28*c*, and/or any combination thereof.

In an exemplary embodiment, the step 68 of the method 58 is substantially identical to the step 62 of the method 58, as described above, and therefore the step 68 will not be described in further detail.

In an exemplary embodiment, the step 70 of the method 58 is substantially identical to the step 64 of the method 58, as described above, and therefore the step 70 will not be described in further detail.

Figure 11:
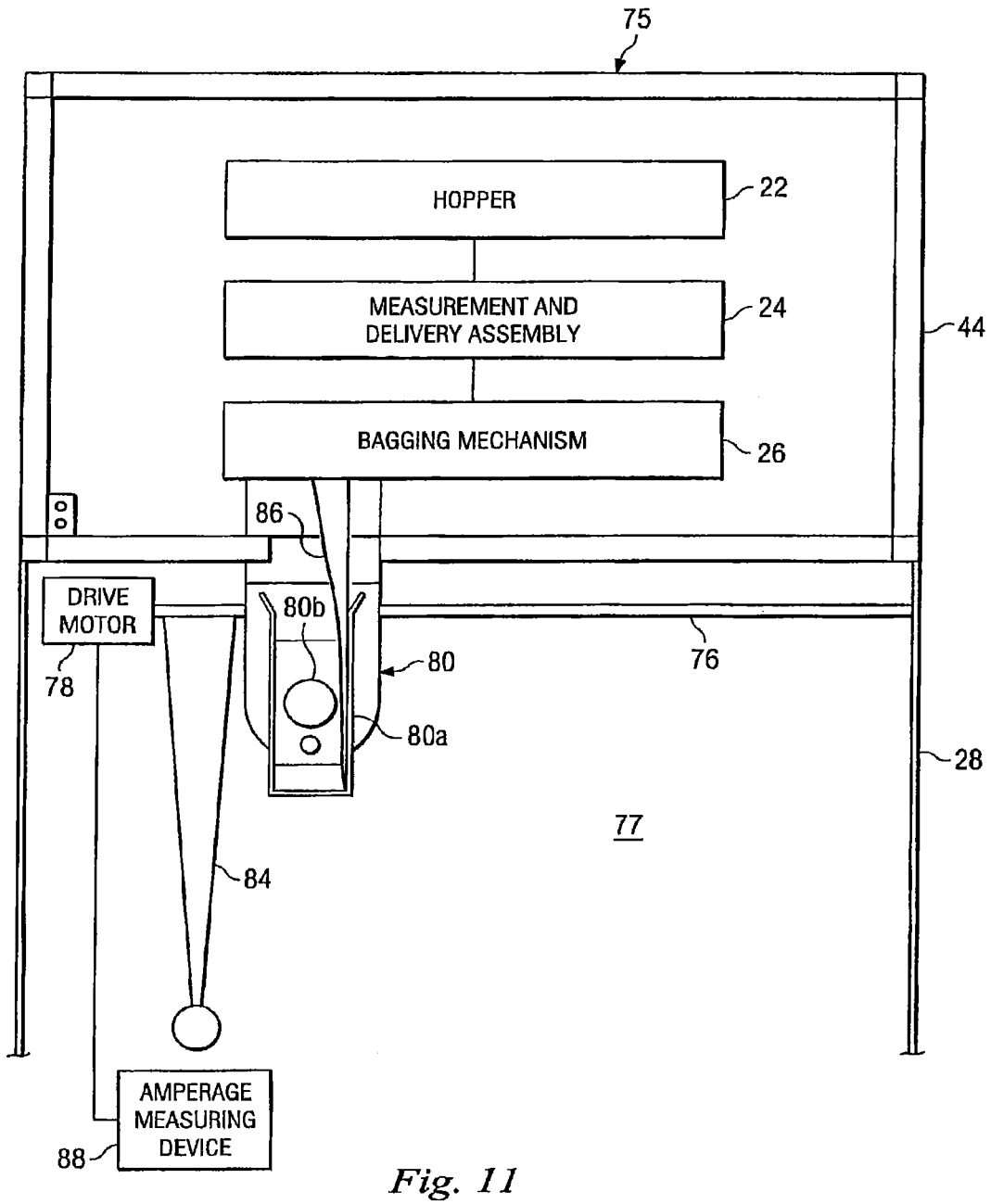
FIG. 11 is partial diagrammatic illustration/partial sectional view of a portion of an apparatus to be used in the system of FIGS. 1 and 2 with, or in place of, the apparatus of FIGS. 1, 3 and 4, according to an exemplary embodiment.

In an exemplary embodiment, as illustrated in FIG. 11 with continuing reference to FIGS. 1-10, an apparatus is generally referred to by the reference numeral 75 and includes several components included in the apparatus 12, which components are given the same reference numerals. In the apparatus 75 shown in FIG. 11, a pair of linear tracks 76 are coupled to respective upper portions of opposing inside walls of the freezer 28. In an exemplary embodiment, the linear tracks 76 are coupled to, and extend between, respective upper portions of the inside front and back walls of the freezer 28. In an exemplary embodiment, the linear tracks 76 are coupled to, and extend between, respective upper portions of the opposing inside side walls of the freezer 28. In an exemplary embodiment, the linear tracks 76 are coupled to the inside ceiling wall of the freezer 28. In an exemplary embodiment, the linear tracks 76 extend across the majority of an internal region 77 defined by the freezer 28, in a front-to-back, side-to-side, or diagonal direction. In an exemplary embodiment, the linear tracks 76 are spaced in a parallel relation within the internal region 77. In an exemplary embodiment, instead of a pair of linear tracks 76, the apparatus 75 includes only one linear track. In an exemplary embodiment, instead of a pair of linear tracks 76, the apparatus 75 includes three or more linear tracks. In an exemplary embodiment, instead of only linear portions, the tracks 76 include one or more linear portions, one or more curved portions, and/or any combination thereof.

A drive motor 78 is operably coupled to the linear tracks 76, and is adapted to drive the tracks 76, under conditions to be described below. A fixed kicker assembly 80, which includes a bag basket 80*a* and a rotator motor 80*b* operably coupled thereto, is fixedly positioned within the region 77 defined by the freezer 28. In an exemplary embodiment, the fixed kicker assembly 80 is coupled to the inside ceiling wall of the freezer 28. In an exemplary embodiment, instead of, or in addition to being coupled to the freezer 28, the fixed kicker assembly 80 is coupled to one or more of the enclosure 44, the hopper 22, the bagging mechanism 26, and the measurement and delivery assembly 24.

A movable push arm 84 is coupled to the tracks 76. In an exemplary embodiment, the tracks 76 are spaced in a parallel relation, and one of the tracks 76 is coupled to the push arm 84 at one location, and the other of the tracks 76 is coupled to the push arm 84 at another location. In an exemplary embodiment, the tracks 76 are spaced in a parallel relation, and the tracks 76 are coupled to the push arm 84 at either side thereof, respectively. The bag basket 80*a* is adapted to receive a bag 86 from the bagging mechanism 26, and hold the bag 86 while the bag 86 is filled with ice during the operation of the measurement and delivery assembly 24 and the bagging mechanism 26, under conditions to be described below. The movable push arm 84 is adapted to move along the tracks 76 and return to its home position proximate the drive motor 78 (shown in FIG. 11), under conditions to be described below. In an exemplary embodiment, the movable push arm 84 is also adapted to move vertically, as viewed in FIG. 11.

An amperage measuring device 88 is operably coupled to the drive motor 78, and is adapted to monitor the push arm 84, under conditions to be described below. In an exemplary embodiment, the amperage measuring device 88 is disposed within, and/or mounted to, the enclosure 44 and/or the freezer 28.

In an exemplary embodiment, the drive motor 78, the rotator motor 80b, and the amperage measuring device 88 are operably coupled to the computer 32 of the control system 30. In an exemplary embodiment, one or more of the drive motor 78, the rotator motor 80b, and the amperage measuring device 88 are operably coupled to the computer 32. The remainder of the apparatus 75 is substantially identical to the apparatus 12 and therefore the remainder of the apparatus 75 will not be described in further detail.

In an exemplary embodiment, as illustrated in FIG. 12 with continuing reference to FIGS. 1-11, a method of operating the apparatus 75 is generally referred to by the reference numeral 90 and includes filling the bag 86 with ice in step 92, distributing the ice-filled bag 86 in the freezer 28 in step 94, and determining in step 96 whether the freezer 28 is filled with ice-filled bags. If not, then another bag is filled with ice in step 98, and the bag filled with ice is distributed in the freezer 28 in step 100. The steps 96, 98 and 100 are repeated until it is determined in the step 100 that the freezer 28 is filled with bags filled with ice, at which point the apparatus 75 enters in step 101 the "merchandiser full" mode in which the apparatus 75 ceases automatically bagging any more ice, and/or at least ceases introducing any more ice-filled bags into the freezer 28. In an exemplary embodiment, the method 90 is repeated when a predetermined condition is satisfied; examples of such a predetermined condition include, but are not limited to, the passage of a predetermined amount of time, the detection of the opening of the door 28b of the freezer 28 using the sensor 28c, and/or any combination thereof.

In an exemplary embodiment, filling the bag 86 with ice in the step 92 of the method 90 is substantially similar to the execution of the steps 62 and 68 of the method 58, as described above. Therefore, the step 92 will not be described in further detail.

Figure 14:
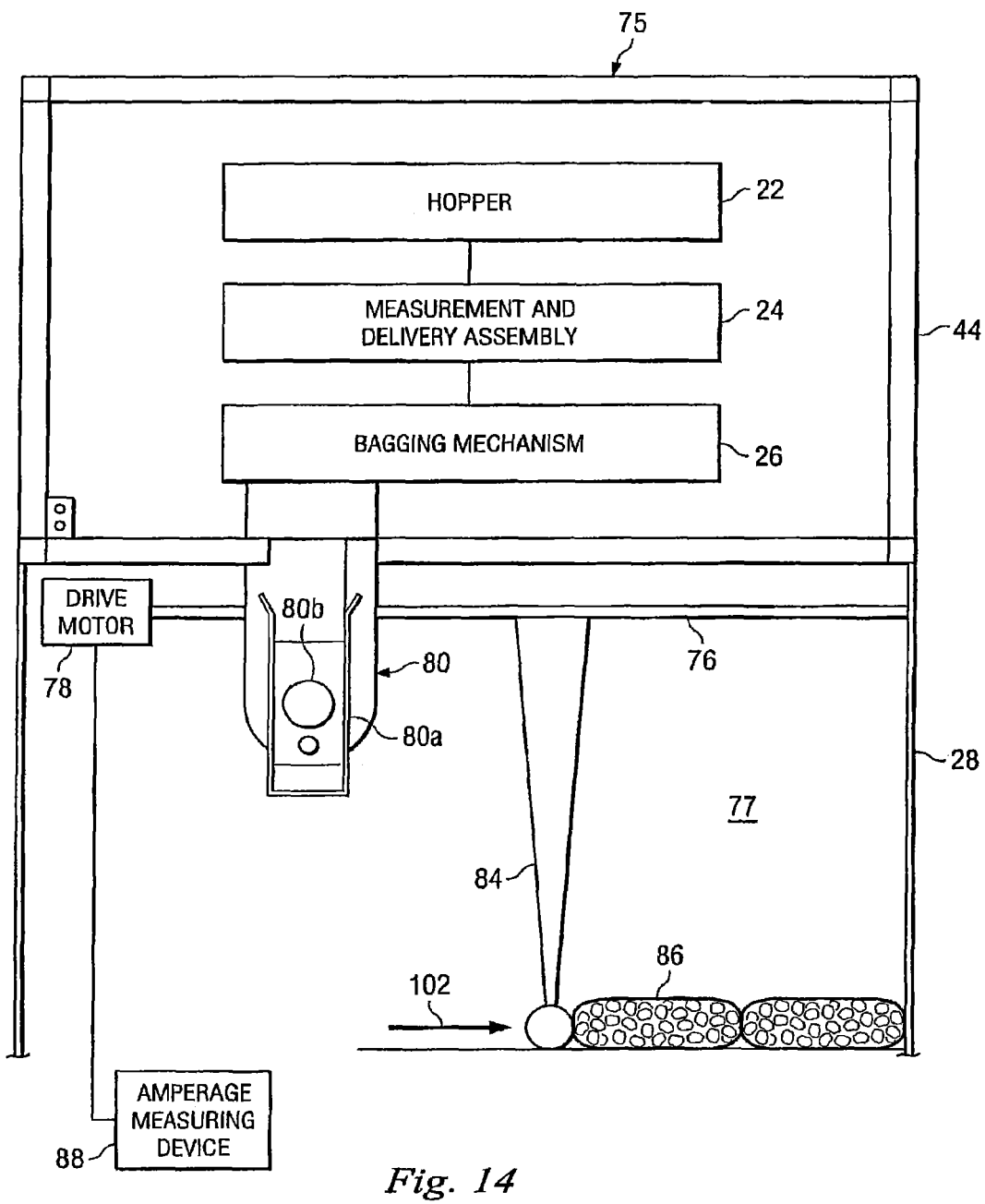
FIG. 14 is a view similar to that of FIG. 11, but depicting the apparatus of FIG. 11 in another operational mode during the execution of the step of FIG. 13, according to an exemplary embodiment.

In an exemplary embodiment, as illustrated in FIGS. 13 and 14 with continuing reference to FIGS. 1-12, to distribute the ice-filled bag 86 in the freezer 28 in the step 94 of the method 90, the kicker assembly 80 discharges the ice-filled bag 86 into the region 77 defined by the freezer 28 in step 94a, and, in step 94b, the ice-filled bag 86 is moved within the region 77 by pushing the ice-filled bag 86 with the push arm 84. During or after the step 94b, it is determined in step 94c whether the ice-filled bag 86 can be pushed any farther by the push arm 84. If not, then an available space in the internal region 77 in which to dispose the ice-filled bag 86 has been searched for and identified, and the push arm 84 stops pushing the ice-filled bag 86 and the push arm 84 is returned to its home position in step 94d.

In an exemplary embodiment, with continuing reference to FIGS. 1-14, to discharge the ice-filled bag 86 from the fixed kicker assembly 80 in the step 94a of the step 94 of the method 90, the motor 80b of the kicker assembly 80 rotates the basket 80a clockwise, as viewed in FIG. 14, thereby causing the ice-filled bag 86 to fall out of the basket 80a of the kicker assembly 80. In an exemplary embodiment, after the ice-filled bag 86 is discharged, the motor 80b rotates the basket 80a back to its upright position.

In an exemplary embodiment, with continuing reference to FIGS. 1-14, to move the ice-filled bag 86 in the region 77 defined by the freezer 28 by pushing the ice-filled bag 86 with the push arm 84 in the step 94b of the step 94 of the method 90, the motor 78 drives the tracks 76, thereby moving the push arm 84, which eventually engages and pushes the ice-filled bag 86 within the region 77 defined by the freezer 28, thereby causing the ice-filled bag 86 to move away from the fixed kicker assembly 80, as indicated by an arrow 102 in FIG. 14. In an exemplary embodiment, before or during the driving of the tracks 76, the vertical position of the push arm 84 is adjusted to ensure sufficient contact with the ice-filled bag 86.

In an exemplary embodiment, with continuing reference to FIGS. 1-14, to determine in the step 94c whether the ice-filled bag 86 can be pushed any farther by the push arm 84, the amperage measuring device 88 compares the amperage draw by the motor 78 with a predetermined amperage amount. If the motor 78 encounters a resistance while pushing the ice-filled bag 86 during the step 94b such that, in response, the amperage draw by the motor 78 increases beyond the predetermined amperage amount, the amperage measuring device 88 detects this increase in amperage draw, thereby determining that the ice-filled bag 86 cannot be pushed any farther by the push arm 84. In an exemplary embodiment, the source of the resistance encountered during the step 94b is another ice-filled bag, as shown in FIG. 14.

In an exemplary embodiment, with continuing reference to FIGS. 1-14, in response to determining that the ice-filled bag 86 cannot be pushed any farther by the push arm 84 in the step 94c, the amperage measuring device 88 sends one or more signals to the motor 78 in the step 94d. In response to receiving the one or more signals from the amperage measuring device 68, the motor 78 reverses its drive direction of the tracks 76, thereby causing the push arm 84 to stop pushing the ice-filled bag 86 and return to its home position in the step 94d. In an exemplary embodiment, instead of, or in addition to sending one or more signals to the motor 78 in the step 94d, the amperage measuring device 88 sends one or more signals to the computer 32, which, in response, sends one or more signals to the motor 78 to thereby reverse the drive direction of the tracks 76.

In an exemplary embodiment, with continuing reference to FIGS. 1-14, to determine whether the freezer 28 is full of ice-filled bags in the step 96 of the method 90, the drive motor 78 and/or one or more other sensors in the enclosure 44 and/or the freezer 28 of the apparatus 75 detects, senses and/or monitors the amount of travel the push arm 84 underwent during the step 94 of the method 90. If the amount of travel of the push arm 84 falls below a predetermined amount, then it is determined in the step 96 that the freezer 28 is full of ice-filled bags, at which point the apparatus 75 enters in the step 101 the "merchandiser full" mode in which the apparatus 75 ceases automatically bagging any more ice, and/or at least ceases introducing any more ice-filled bags into the freezer 28, as noted above.

In an exemplary embodiment, the step 98 of the method 90 is substantially identical to the step 92 of the method 90, and therefore the step 98 will not be described in further detail.

In an exemplary embodiment, the step 100 of the method 90 is substantially identical to the step 94 of the method 90, and therefore the step 100 will not be described in further detail.

As noted above, in an exemplary embodiment, the method 90 is repeated when a predetermined condition is satisfied; examples of such a predetermined condition include, but are not limited to, the passage of a predetermined amount of time, the detection of the opening of the door 28b of the freezer 28 using the sensor 28c, and/or any combination thereof.

In an exemplary embodiment, at least one other apparatus substantially similar to the apparatus 12 and/or 75 and located at the same or another location may be operably coupled to the server 14 via the network 16. In an exemplary embodiment, a plurality of apparatuses substantially similar to the apparatus 12 and/or 75 and located at the same and/or different locations may be operably coupled to the server 14 via the network 16. In several exemplary embodiments, the computer readable medium of the server 14, and the contents stored therein, may be distributed throughout the system 10. In an exemplary embodiment, the computer readable medium of the server 14 and the contents stored therein may be distributed across a plurality of apparatuses such as, for example, the apparatus 12, the apparatus 75 and/or one or more other apparatuses substantially similar to the apparatus 12 and/or 75. In an exemplary embodiment, the server 14 may include one or more host computers, the computer 32 of the apparatus 12 and/or 75, and/or one or more computers in one or more other apparatuses that are substantially similar to the apparatus 12 and/or 75.

In an exemplary embodiment, the apparatus 12 and/or 75 may be characterized as a thick client. In an exemplary embodiment, the apparatus 12 and/or 75 may be characterized as a thin client, and therefore the functions and/or uses of the computer 32 including the processor 34 and/or the memory 36 may instead be functions and/or uses of the server 14. In several exemplary embodiments, the apparatus 12 and/or 75 may function as both a thin client and a thick client, with the degree to which the apparatus functions as a thin client and/or a thick client being dependent upon a variety of factors including, but not limited to, the instructions stored in the memory 36 for execution by the processor 34.

In an exemplary embodiment, as illustrated in FIG. 15 with continuing reference to FIGS. 1-14, an illustrative node 104 for implementing one or more embodiments of one or more of the above-described networks, elements, methods and/or steps, and/or any combination thereof, is depicted. The node 104 includes a microprocessor 104a, an input device 104b, a storage device 104c, a video controller 104d, a system memory 104e, a display 104f, and a communication device 104g all interconnected by one or more buses 104h. In several exemplary embodiments, the storage device 104c may include a floppy drive, hard drive, CD-ROM, optical drive, any other form of storage device and/or any combination thereof. In several exemplary embodiments, the storage device 104c may include, and/or be capable of receiving, a floppy disk, CD-ROM, DVD-ROM, or any other form of computer-readable medium that may contain executable instructions. In several exemplary embodiments, the communication device 104g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the central server 14, the network 16, the remote user interfaces 18a and 18b, the control system 30, the computer 32, the control panel 42, the communication module 38, the sensors 40a, 40b, 40c and 40d, any other of the above-described sensors, and/or any of the above-described motors is, or at least includes, the node 104 and/or components thereof, and/or one or more nodes that are substantially similar to the node 104 and/or components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine.

In several exemplary embodiments, data structures are defined organizations of data that may enable an embodiment of the present disclosure. In an exemplary embodiment, a data structure may provide an organization of data, or an organization of executable code. In several exemplary embodiments, data signals could be carried across transmission mediums and store and transport various data structures, and, thus, may be used to transport an embodiment of the present disclosure.

In several exemplary embodiments, the network 16, and/or one or more portions thereof, may be designed to work on any specific architecture. In an exemplary embodiment, one or more portions of the network 16 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, while different steps, processes, and procedures are described as appearing as distinct acts, one or more of the steps, one or more of the processes, and/or one or more of the procedures could also be performed in different orders, simultaneously and/or sequentially. In several exemplary embodiments, the steps, processes and/or procedures could be merged into one or more steps, processes and/or procedures.

An apparatus has been described that includes a temperature-controlled storage unit defining an internal region in which a plurality of ice-filled bags are adapted to be stored, a portion of the internal region being an available space in which a first ice-filled bag is adapted to be disposed; one or more tracks extending within the internal region; and one or more of the following: a first kicker assembly coupled to the one or more tracks and movable therealong within the internal region, the first kicker assembly comprising a first basket sized to receive the first ice-filled bag before the first ice-filled bag is disposed in the available space; and a push arm coupled to the one or more tracks and movable therealong within the internal region, the push arm being configured to engage the first ice-filled bag to thereby dispose the first ice-filled bag in the available space. In an exemplary embodiment, the apparatus comprises a drive motor operably coupled to the one or more tracks for driving the one or more tracks to thereby cause the first kicker assembly and/or the push arm to move along the one or more tracks; an ice maker for making the ice; a hopper operably coupled to the ice maker for receiving the ice from the ice maker; a measurement and delivery assembly operably coupled to the hopper for measuring and delivering an amount of the ice into an empty bag used to produce the first ice-filled bag; a bagging mechanism operably coupled to the measurement and delivery assembly for providing the empty bag used to produce the first ice-filled bag; and a control system operably coupled to one or more of the storage unit, the first kicker assembly, the push arm, the drive motor, the ice maker, the hopper, the measurement and delivery assembly, and the bagging mechanism, the control system comprising a computer comprising a processor; and a memory accessible to the processor for storing instructions executable by the processor; and one or more sensors operably coupled to the computer and adapted to monitor one or more of the storage unit, the first kicker assembly, the push arm, the drive motor, the ice maker, the hopper, the measurement and delivery assembly, and the bagging mechanism. In an exemplary embodiment, the apparatus comprises the first kicker assembly; wherein the apparatus further comprises a drive motor operably coupled to the one or more tracks for driving the one or more tracks to thereby cause the first kicker assembly to move along the one or more tracks within the internal region; a first sensor coupled to the first kicker assembly for searching for the available space; and a second sensor coupled to the storage unit and vertically positioned below the first kicker assembly for determining whether the first kicker assembly will be blocked as it moves along the one or more tracks; wherein the first kicker assembly further comprises a first rotator motor operably coupled to the first basket for rotating the first basket to thereby discharge the first ice-filled bag from the first kicker assembly and dispose the first ice-filled bag in the available space. In an exemplary embodiment, the apparatus comprises the push arm; wherein the apparatus further comprises a drive motor operably coupled to the one or more tracks for driving the one or more tracks to thereby cause the push arm to move along the one or more tracks within the internal region; a second kicker assembly, at least a portion of which is fixedly positioned within the internal region, the second kicker assembly comprising a second basket sized to receive the first ice-filled bag before the first ice-filled bag is disposed in the available space; and a second rotator motor operably coupled to the second basket for rotating the second basket to thereby discharge the first ice-filled bag from the second kicker assembly before the push arm engages the first ice-filled bag; and an amperage measuring device operably coupled to the drive motor for controlling the drive motor to thereby control the push arm. In an exemplary embodiment, the apparatus comprises the first kicker assembly; wherein the first kicker assembly further comprises a first rotator motor operably coupled to the first basket for rotating the first basket to thereby discharge the first ice-filled bag from the first kicker assembly and dispose the first ice-filled bag in the available space; and wherein the apparatus further comprises a drive motor operably coupled to the one or more tracks for driving the one or more tracks to thereby cause the first kicker assembly to move along the one or more tracks within the internal region; a first sensor coupled to the first kicker assembly for searching for the available space; a second sensor coupled to the storage unit and vertically positioned below the first kicker assembly for determining whether the first kicker assembly will be blocked as it moves along the one or more tracks; an ice maker for making the ice; a hopper operably coupled to the ice maker for receiving the ice from the ice maker; a measurement and delivery assembly operably coupled to the hopper for measuring and delivering an amount of the ice into an empty bag used to produce the first ice-filled bag; a bagging mechanism operably coupled to the measurement and delivery assembly for providing the empty bag used to produce the first ice-filled bag; and a control system operably coupled to one or more of the storage unit, the first kicker assembly, the push arm, the drive motor, the ice maker, the hopper, the measurement and delivery assembly, and the bagging mechanism, the control system comprising a computer comprising a processor; and a memory accessible to the processor for storing instructions executable by the processor; the first and second sensors; and one or more other sensors operably coupled to the computer and adapted to monitor one or more of the storage unit, the first kicker assembly, the push arm, the drive motor, the ice maker, the hopper, the measurement and delivery assembly, and the bagging mechanism.

A method has been described that includes distributing a first ice-filled bag within an internal region defined by a temperature-controlled storage unit, comprising providing a first kicker assembly comprising a first basket; disposing the first ice-filled bag in the first basket of the first kicker assembly; searching for a first available space in the internal region in which to dispose the first ice-filled bag; and disposing the first ice-filled bag in the first available space in the internal region, comprising discharging the first ice-filled bag from the first kicker assembly. In an exemplary embodiment, the method comprises determining whether the temperature-controlled storage unit is full of bags filled with ice after distributing the first ice-filled bag within the internal region defined by the temperature-controlled storage unit; and if the temperature-controlled storage unit is not full of bags filled with ice after distributing the first ice-filled bag within the internal region defined by the temperature-controlled storage unit, then (a) filling another bag with ice to thereby produce another ice-filled bag; (b) distributing the another ice-filled bag within the internal region defined by the temperature-controlled storage unit; and (c) if the temperature-controlled storage unit is not full of bags filled with ice after distributing the another ice-filled bag within the internal region defined by the temperature-controlled storage unit, then repeating steps (a) and (b) until the temperature-controlled storage unit is full of bags filled with ice. In an exemplary embodiment, the method comprises making the ice; before distributing the first ice-filled bag within the internal region defined by the temperature-controlled storage unit, filling a first bag with the ice to thereby produce the first ice-filled bag, comprising providing the first bag used to produce the first ice-filled bag; measuring a first amount of the ice; disposing the first amount of the ice in the first bag; if the first bag in which the first amount of the ice is disposed is not filled with ice, then (d) measuring another amount of the ice; (e) disposing the another measured amount of the ice in the first bag in which the first amount of ice is disposed; and (f) if the first bag in which the first and another amounts of ice are disposed is not filled with ice, then repeating steps (d) and (e) until the first bag is filled with ice to thereby produce the first ice-filled bag. In an exemplary embodiment, disposing the first ice-filled bag in the first available space in the internal region further comprises extending one or more tracks within the internal region; coupling the first kicker assembly to the one or more tracks; operably coupling a drive motor to the one or more tracks; and driving the one or more tracks using the drive motor to thereby move the first kicker assembly and thus the first ice-filled bag. In an exemplary embodiment, discharging the first ice-filled bag from the first kicker assembly comprises rotating the first basket to thereby cause the first ice-filled bag to fall out of the first basket; wherein searching for the first available space in the internal region comprises coupling a first sensor to the first kicker assembly; and searching for the first available space in the internal region using the first sensor during driving the one or more tracks using the drive motor; and wherein determining whether the temperature-controlled storage unit is full of bags filled with ice after distributing the first ice-filled bag within the internal region defined by the temperature-controlled storage unit comprises disposing a second sensor within the internal region defined by the temperature-controlled storage unit. In an exemplary embodiment, disposing the first ice-filled bag in the first available space in the internal region further comprises extending one or more tracks within the internal region; coupling a push arm to the one or more tracks; operably coupling a drive motor to the one or more tracks; after discharging the first ice-filled bag from the first kicker assembly, driving the one or more tracks using the drive motor to thereby engage the first ice-filled bag with the push arm; and continuing to drive the one or more tracks using the drive motor to thereby move the push arm and thus the first ice-filled bag. In an exemplary embodiment, discharging the first ice-filled bag from the first kicker assembly comprises rotating the first basket to thereby cause the first ice-filled bag to fall out of the first basket; wherein searching for the first available space in the internal region comprises coupling an amperage measuring device to the drive motor; using the amperage measuring device to measure the amperage draw by the drive motor during continuing to drive the one or more tracks using the drive motor; and comparing the measured amperage draw with a predetermined amperage amount; and wherein determining whether the temperature-controlled storage unit is full of bags filled with ice after distributing the first ice-filled bag within the internal region defined by the temperature-controlled storage unit comprises determining the amount of travel the push arm underwent during the steps of driving the one or more tracks and continuing to drive the one or more tracks.

A system has been described that includes means for distributing a first ice-filled bag within an internal region defined by a temperature-controlled storage unit, comprising means for providing a first kicker assembly comprising a first basket; means for disposing the first ice-filled bag in the first basket of the first kicker assembly; means for searching for a first available space in the internal region in which to dispose the first ice-filled bag; and means for disposing the first ice-filled bag in the first available space in the internal region, comprising means for discharging the first ice-filled bag from the first kicker assembly. In an exemplary embodiment, the system comprises means for determining whether the temperature-controlled storage unit is full of bags filled with ice after distributing the first ice-filled bag within the internal region defined by the temperature-controlled storage unit; and means for if the temperature-controlled storage unit is not full of bags filled with ice after distributing the first ice-filled bag within the internal region defined by the temperature-controlled storage unit, then (a) filling another bag with ice to thereby produce another ice-filled bag; (b) distributing the another ice-filled bag within the internal region defined by the temperature-controlled storage unit; and (c) if the temperature-controlled storage unit is not full of bags filled with ice after distributing the another ice-filled bag within the internal region defined by the temperature-controlled storage unit, then repeating steps (a) and (b) until the temperature-controlled storage unit is full of bags filled with ice. In an exemplary embodiment, the system comprises means for making the ice; means for before distributing the first ice-filled bag within the internal region defined by the temperature-controlled storage unit, filling a first bag with the ice to thereby produce the first ice-filled bag, comprising means for providing the first bag used to produce the first ice-filled bag; means for measuring a first amount of the ice; means for disposing the first amount of the ice in the first bag; means for if the first bag in which the first amount of the ice is disposed is not filled with ice, then (d) measuring another amount of the ice; (e) disposing the another measured amount of the ice in the first bag in which the first amount of ice is disposed; and (f) if the first bag in which the first and another amounts of ice are disposed is not filled with ice, then repeating steps (d) and (e) until the first bag is filled with ice to thereby produce the first ice-filled bag. In an exemplary embodiment, means for disposing the first ice-filled bag in the first available space in the internal region further comprises means for extending one or more tracks within the internal region; means for coupling the first kicker assembly to the one or more tracks; means for operably coupling a drive motor to the one or more tracks; and means for driving the one or more tracks using the drive motor to thereby move the first kicker assembly and thus the first ice-filled bag. In an exemplary embodiment, means for discharging the first ice-filled bag from the first kicker assembly comprises means for rotating the first basket to thereby cause the first ice-filled bag to fall out of the first basket; wherein means for searching for the first available space in the internal region comprises means for coupling a first sensor to the first kicker assembly; and means for searching for the first available space in the internal region using the first sensor during driving the one or more tracks using the drive motor; and wherein means for determining whether the temperature-controlled storage unit is full of bags filled with ice after distributing the first ice-filled bag within the internal region defined by the temperature-controlled storage unit comprises means for disposing a second sensor within the internal region defined by the temperature-controlled storage unit. In an exemplary embodiment, means for disposing the first ice-filled bag in the first available space in the internal region further comprises means for extending one or more tracks within the internal region; means for coupling a push arm to the one or more tracks; means for operably coupling a drive motor to the one or more tracks; means for after discharging the first ice-filled bag from the first kicker assembly, driving the one or more tracks using the drive motor to thereby engage the first ice-filled bag with the push arm; and means for continuing to drive the one or more tracks using the drive motor to thereby move the push arm and thus the first ice-filled bag. In an exemplary embodiment, means for discharging the first ice-filled bag from the first kicker assembly comprises means for rotating the first basket to thereby cause the first ice-filled bag to fall out of the first basket; wherein means for searching for the first available space in the internal region comprises means for coupling an amperage measuring device to the drive motor; means for using the amperage measuring device to measure the amperage draw by the drive motor during continuing to drive the one or more tracks using the drive motor; and means for comparing the measured amperage draw with a predetermined amperage amount; and wherein means for determining whether the temperature-controlled storage unit is full of bags filled with ice after distributing the first ice-filled bag within the internal region defined by the temperature-controlled storage unit comprises means for determining the amount of travel the push arm underwent during the steps of driving the one or more tracks and continuing to drive the one or more tracks.

A computer readable medium has been described that includes a plurality of instructions stored therein, the plurality of instructions comprising instructions for distributing a first ice-filled bag within an internal region defined by a temperature-controlled storage unit, comprising instructions for disposing the first ice-filled bag in a first basket of a first kicker assembly; instructions for searching for a first available space in the internal region in which to dispose the first ice-filled bag; and instructions for disposing the first ice-filled bag in the first available space in the internal region, comprising instructions for discharging the first ice-filled bag from the first kicker assembly; instructions for determining whether the temperature-controlled storage unit is full of bags filled with ice after distributing the first ice-filled bag within the internal region defined by the temperature-controlled storage unit; instructions for if the temperature-controlled storage unit is not full of bags filled with ice after distributing the first ice-filled bag within the internal region defined by the temperature-controlled storage unit, then (a) filling another bag with ice to thereby produce another ice-filled bag; (b) distributing the another ice-filled bag within the internal region defined by the temperature-controlled storage unit; and (c) if the temperature-controlled storage unit is not full of bags filled with ice after distributing the another ice-filled bag within the internal region defined by the temperature-controlled storage unit, then repeating steps (a) and (b) until the temperature-controlled storage unit is full of bags filled with ice; instructions for making the ice; and instructions for before distributing the first ice-filled bag within the internal region defined by the temperature-controlled storage unit, filling a first bag with the ice to thereby produce the first ice-filled bag, comprising instructions for measuring a first amount of the ice; instructions for disposing the first amount of the ice in the first bag; instructions for if the first bag in which the first amount of the ice is disposed is not filled with ice, then (d) measuring another amount of the ice; (e) disposing the another measured amount of the ice in the first bag in which the first amount of ice is disposed; and (f) if the first bag in which the first and another amounts of ice are disposed is not filled with ice, then repeating steps (d) and (e) until the first bag is filled with ice to thereby produce the first ice-filled bag.

It is understood that variations may be made in the foregoing without departing from the scope of the disclosure. Furthermore, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus comprising:
a temperature-controlled storage unit defining an internal region in which a plurality of ice-filled bags are adapted to be stored, a portion of the internal region being an available space in which a first ice-filled bag is adapted to be disposed;

one or more tracks extending within the internal region;

a first kicker assembly coupled to the one or more tracks and movable therealong within the internal region, the first kicker assembly comprising a first basket sized to support the first ice-filled bag before the first ice-filled bag is disposed in the available space; and a first sensor coupled to the first kicker assembly and movable therewith, relative to the temperature-controlled storage unit, to identify the available space before the first ice-filled bag is disposed in the available space;

wherein, after the first sensor has identified the available space, the first basket is actuated to dispose the first ice-filled bag in the available space; and wherein, during the actuation of the first basket to dispose the first ice-filled bag in the available space, the first sensor is stationary.

2. The apparatus of claim 1 further comprising:

a drive motor operably coupled to the one or more tracks for driving the one or more tracks to thereby cause the first kicker assembly to move along the one or more tracks;

an ice maker for making ice;

a hopper operably coupled to the ice maker for receiving the ice from the ice maker;

a measurement and delivery assembly operably coupled to the hopper for measuring and delivering an amount of the ice into an empty bag used to produce the first ice-filled bag;

a bagging mechanism operably coupled to the measurement and delivery assembly for providing the empty bag used to produce the first ice-filled bag; and a control system operably coupled to one or more of the storage unit, the first kicker assembly, the drive motor, the ice maker, the hopper, the measurement and delivery assembly, and the bagging mechanism, the control system comprising:
  a computer comprising:
    a processor; and
    a memory accessible to the processor for storing instructions executable by the processor;
  the first sensor; and
  one or more other sensors operably coupled to the computer and adapted to monitor one or more of the storage unit, the first kicker assembly, the drive motor, the ice maker, the hopper, the measurement and delivery assembly, and the bagging mechanism.

3. The apparatus of claim 1, further comprising a drive motor operably coupled to the one or more tracks for driving the one or more tracks to thereby cause the first kicker assembly to move along the one or more tracks within the internal region.

4. The apparatus of claim 1, wherein the first kicker assembly further comprises a first rotator motor operably coupled to the first basket;

wherein the first rotator motor is adapted to rotate the basket to thereby actuate the basket and dispose the first ice-filled bag in the available space.

5. An apparatus comprising:

a temperature-controlled storage unit defining an internal region in which a plurality of ice-filled bags are adapted to be stored, a portion of the internal region being an available space in which a first ice-filled bag is adapted to be disposed;

one or more tracks extending within the internal region;

a first kicker assembly coupled to the one or more tracks and movable therealong within the internal region, the first kicker assembly comprising a first basket sized to support the first ice-filled bag before the first ice-filled bag is disposed in the available space;

a drive motor operably coupled to the one or more tracks for driving the one or more tracks to thereby cause the first kicker assembly to move along the one or more tracks within the internal region;

a first sensor coupled to the first kicker assembly for searching for the available space; and a second sensor coupled to the storage unit and vertically positioned below the first kicker assembly for determining whether the first kicker assembly will be blocked as it moves along the one or more tracks;

wherein the first kicker assembly further comprises a first rotator motor operably coupled to the first basket for rotating the first basket to thereby discharge the first ice-filled bag from the first kicker assembly and dispose the first ice-filled bag in the available space.

6. An apparatus comprising:

a temperature-controlled storage unit defining an internal region in which a plurality of ice-filled bags are adapted to be stored, a portion of the internal region being an available space in which a first ice-filled bag is adapted to be disposed;

one or more tracks extending within the internal region;

a first kicker assembly coupled to the one or more tracks and movable therealong within the internal region, the first kicker assembly comprising a first basket sized to support the first ice-filled bag before the first ice-filled bag is disposed in the available space;

wherein the first kicker assembly further comprises a first rotator motor operably coupled to the first basket for rotating the first basket to thereby discharge the first ice-filled bag from the first kicker assembly and dispose the first ice-filled bag in the available space;

and wherein the apparatus further comprises:

a drive motor operably coupled to the one or more tracks for driving the one or more tracks to thereby cause the first kicker assembly to move along the one or more tracks within the internal region;

a first sensor coupled to the first kicker assembly for searching for the available space;

a second sensor coupled to the storage unit and vertically positioned below the first kicker assembly for determining whether the first kicker assembly will be blocked as it moves along the one or more tracks;

an ice maker for making ice;

a hopper operably coupled to the ice maker for receiving the ice from the ice maker;

a measurement and delivery assembly operably coupled to the hopper for measuring and delivering an amount of the ice into an empty bag used to produce the first ice-filled bag;

a bagging mechanism operably coupled to the measurement and delivery assembly for providing the empty bag used to produce the first ice-filled bag; and a control system operably coupled to one or more of the storage unit, the first kicker assembly, the drive motor, the ice maker, the hopper, the measurement and delivery assembly, and the bagging mechanism, the control system comprising:
a computer comprising:
  a processor; and
  a memory accessible to the processor for storing instructions executable by the processor;
the first and second sensors; and
one or more other sensors operably coupled to the computer and adapted to monitor one or more of the storage unit, the first kicker assembly, the drive motor, the ice maker, the hopper, the measurement and delivery assembly, and the bagging mechanism.

7. An apparatus comprising:
a temperature-controlled storage unit defining an internal region in which a plurality of ice-filled bags are adapted to be stored, a portion of the internal region being an available space in which a first ice-filled bag is adapted to be disposed;
one or more tracks extending within the internal region;
a first kicker assembly coupled to the one or more tracks and movable therealong within the internal region, the first kicker assembly comprising a first basket sized to support the first ice-filled bag before the first ice-filled bag is disposed in the available space; and
a sensor coupled to the storage unit and vertically positioned below the first kicker assembly for determining whether the first kicker assembly will be blocked as it moves along the one or more tracks.

* * * * *